(12) United States Patent
Matsumoto

(10) Patent No.: US 9,866,761 B2
(45) Date of Patent: Jan. 9, 2018

(54) IMAGE DYNAMIC RANGE COMPENSATION DEVICE AND METHOD

(71) Applicant: SAMSUNG DISPLAY CO., LTD., Yongin-si, Gyeonggi-Do (KR)

(72) Inventor: Kazuhiro Matsumoto, Yokohama (JP)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 47 days.

(21) Appl. No.: 15/049,622

(22) Filed: Feb. 22, 2016

(65) Prior Publication Data

US 2016/0248959 A1    Aug. 25, 2016

(30) Foreign Application Priority Data

Feb. 24, 2015    (JP) .................. 2015-033767

(51) Int. Cl.
*H04N 5/228* (2006.01)
*H04N 5/235* (2006.01)
*G06T 5/00* (2006.01)
*H04N 5/243* (2006.01)
*H04N 1/407* (2006.01)

(52) U.S. Cl.
CPC .......... *H04N 5/2355* (2013.01); *G06T 5/008* (2013.01); *H04N 5/243* (2013.01); *G06T 2207/20208* (2013.01); *H04N 1/4072* (2013.01)

(58) Field of Classification Search
CPC .................................................. H04N 5/2355

USPC ....................................................... 348/222.1
See application file for complete search history.

(56) References Cited

U.S. PATENT DOCUMENTS

2016/0117807 A1    4/2016 Matsumoto

FOREIGN PATENT DOCUMENTS

| JP | 01-120682 | 5/1989 |
|---|---|---|
| JP | 09-050519 | 2/1997 |
| JP | 09-270004 | 10/1997 |
| JP | 10-198801 | 7/1998 |
| JP | 2003-008935 | 1/2003 |
| JP | 2007-006168 | 1/2007 |
| JP | 2008-244591 | 10/2008 |
| JP | 2009-303018 | 12/2009 |
| JP | 2010-063059 | 3/2010 |
| JP | 2010-072982 | 4/2010 |
| JP | 2012-108898 | 6/2012 |
| JP | 2013-210709 | 10/2013 |

*Primary Examiner* — Usman Khan
(74) *Attorney, Agent, or Firm* — F. Chau & Associates, LLC

(57) ABSTRACT

Provided is an image processing device including an obtaining unit configured to obtain image data, a first modulator that multiplies a first coefficient by a reflection-absorption component, which is based on a difference between a pixel value of a pixel of interest among the image data and an illumination component of the pixel of interest, to modulate the reflection-absorption component, a second modulator that multiplies a second coefficient by the illumination component to modulate the illumination component, and an adding unit that adds the reflection-absorption component after modulation to the illumination component after modulation.

20 Claims, 14 Drawing Sheets

IMAGE DYNAMIC RANGE COMPENSATION DEVICE AND METHOD

CROSS-REFERENCE TO RELATED APPLICATIONS

This U.S. non-provisional patent application claims priority under 35 U.S.C. §119 from, and the benefit of, Japanese Patent Application No. JP2015-033767, filed on Feb. 24, 2015, the contents of which are herein incorporated by reference in their entirety.

TECHNICAL FIELD

Embodiments of the present disclosure are directed to an image processing device, an image processing method, and an image processing program.

DISCUSSION OF RELATED ART

Image capture devices, such as digital still cameras, are widely available. Among these capture devices, there are cameras using a so-called dynamic range compression technique, such as a backlight compensation technique or a high dynamic range (HDR) technique. In such devices, image capture is actually performed by degenerating any one or both of a white point and black point of a subject image having a wider brightness range, rather than a dynamic range of a capture device.

In addition, as a technique for improving visibility of the above-described image of which a part of its range is degenerated, there is a technique for performing local dynamic range compensation by processing the image using a Retinex theory. In image-processing using the Retinex theory, an output image, in which local dynamic range compensation is performed, is obtained by separating a brightness component of an input image into an illumination component and a reflectance component, modulating the illumination component, and then re-synthesizing the modulated illumination component and the reflectance component.

One Retinex image processing device performs modulation on a reflectance component to enhance image display. Local dynamic range compensation may also be used.

An image processing device using the Retinex theory may have increased circuit size and complexity.

SUMMARY

The present disclosure provides an image processing device in which the size of a circuit for realizing image processing using a Retinex theory is reducible, and an image processing method and a program for the same.

An exemplary embodiment of the inventive concept provides an image processing device including: an obtaining unit configured to obtain image data; a first modulating unit that multiplies a first coefficient by a reflection-absorption component, which is based on a difference between a pixel value of a pixel of interest among the image data and an illumination component of the pixel of interest, to modulate the reflection-absorption component; a second modulating unit that multiplies a second coefficient by the illumination component to modulate the illumination component; and an adding unit that adds the reflection-absorption component after modulation to the illumination component after modulation.

In an embodiment, the image processing device may further include an amplification factor calculating unit that calculates the first coefficient based on the illumination component.

In an embodiment, the amplification factor calculating unit may calculate the first coefficient on the basis of a second value obtained by multiplying a square of a first value based on the illumination component by a preset third coefficient.

In an embodiment, when the illumination component is L, the third coefficients corresponding to the square of the first value are cr_slope1, cr_slope2, and cr_slope3, a preset gain is cr_gain, and a preset offset value is cr_offset, the first coefficient KCR-G may be calculated based on the following Equation.

$$K_{CR\text{-}G} = cr\_gain\{cr\_slope3(1-L)^3 + cr\_slope2(1-L)^2 + cr\_slope1(1-L)\} + cr\_offset\ 1 = cr\_slope3 + cr\_slope2 + cr\_slope1 \quad [\text{Equation}]$$

In an embodiment, the third coefficient may be preset based on an approximate value of a function that represents a relation between the illumination component and the illumination component after modulation.

In an embodiment, the amplification factor calculating unit may calculate the second coefficient based on the first coefficient.

The image processing device may further include a noise suppressing unit that modulates the reflection-absorption component on the basis of a fourth coefficient calculated based on the illumination component, wherein the first modulating unit modulates the reflection-absorption component by multiplying the first coefficient by the reflection-absorption component modulated based on the fourth coefficient.

In an embodiment, the noise suppressing unit may modulate the reflection-absorption component on the basis of the fourth coefficient with respect to a pixel whose illumination component is equal to or smaller than a threshold value.

In an embodiment, the fourth coefficient may be calculated based on the following Equation, when the illumination component is L, the threshold value is sv_n_th, a maximum value of the fourth coefficient is sv_n_max, and a variation rate of the fourth coefficient is sv_n_grd.

$$K_{SV\text{-}N} = \begin{cases} -sv\_n\_grd \times L + sv\_n\_max & \ldots L \le sv\_n\_th \\ 0 & \ldots \text{otherwise} \end{cases} \quad [\text{Equation}]$$

The image processing device may further include a pattern style intensity calculating unit that calculates a pattern style intensity according to a dispersion on the basis of pixel values of the pixel of interest and each of adjacent pixels arranged within a predetermined range around the pixel of interest, wherein the second modulating unit modulates the illumination component by multiplying the illumination component by the second coefficient controlled based on the pattern style intensity.

In an embodiment, the pattern style intensity calculating unit may calculate the pattern style intensity on the basis of the dispersion and an edge intensity according to a discrepancy between the dispersion and a gradient based on each pixel value of the adjacent pixels.

In an exemplary embodiment of the inventive concept, an image processing method includes: obtaining image data; multiplying a first coefficient by a reflection-absorption component, which is based on a difference between a pixel value of a pixel of interest among the image data and an illumination component of the pixel of interest, to modulate the reflection-absorption component; multiplying a second coefficient by the illumination component to modulate the illumination component; and adding the reflection-absorption component after modulation to the illumination component after modulation.

In an exemplary embodiment image processing method, the illumination component is substantially equal to an input brightness component divided by a reflectance component in accordance with the Retinex theory.

In an exemplary embodiment image processing method, the first and second coefficients are each based on an amplification factor calculation using only the illumination component as input.

In an exemplary embodiment image processing method, an output brightness component is based on the modulated illumination component and the modulated reflection-absorption component.

An exemplary embodiment image processing method includes receiving and displaying the output brightness component on a display.

In an exemplary embodiment image processing method, each of the illumination component, modulated illumination component, reflection-absorption component, and output brightness component may be obtained by mathematical operations consisting of multiplication and addition without recourse to stored look-up values.

An exemplary embodiment image processing method includes suppressing noise in the reflection-absorption component based on the illumination component.

An exemplary embodiment image processing method includes calculating a pattern style intensity based on the input brightness component; and suppressing excessive enhancement of the reflection-absorption component based on the calculated pattern style intensity.

In an exemplary embodiment image processing method, the pattern style intensity is calculated by using a gradient based on a pixel of interest in the obtained image data, and a comparison with the dispersion based on the pixel of interest.

In an exemplary embodiment of the inventive concept, a computer program that is recorded on a recording medium and linked to a computer is configured to execute: obtaining image data; multiplying a first coefficient by a reflection-absorption component, which is based on a difference between a pixel value of a pixel of interest among the image data and an illumination component of the pixel of interest, to modulate the reflection-absorption component; multiplying a second coefficient by the illumination component to modulate the illumination component; and adding the reflection-absorption component after modulation to the illumination component after modulation.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
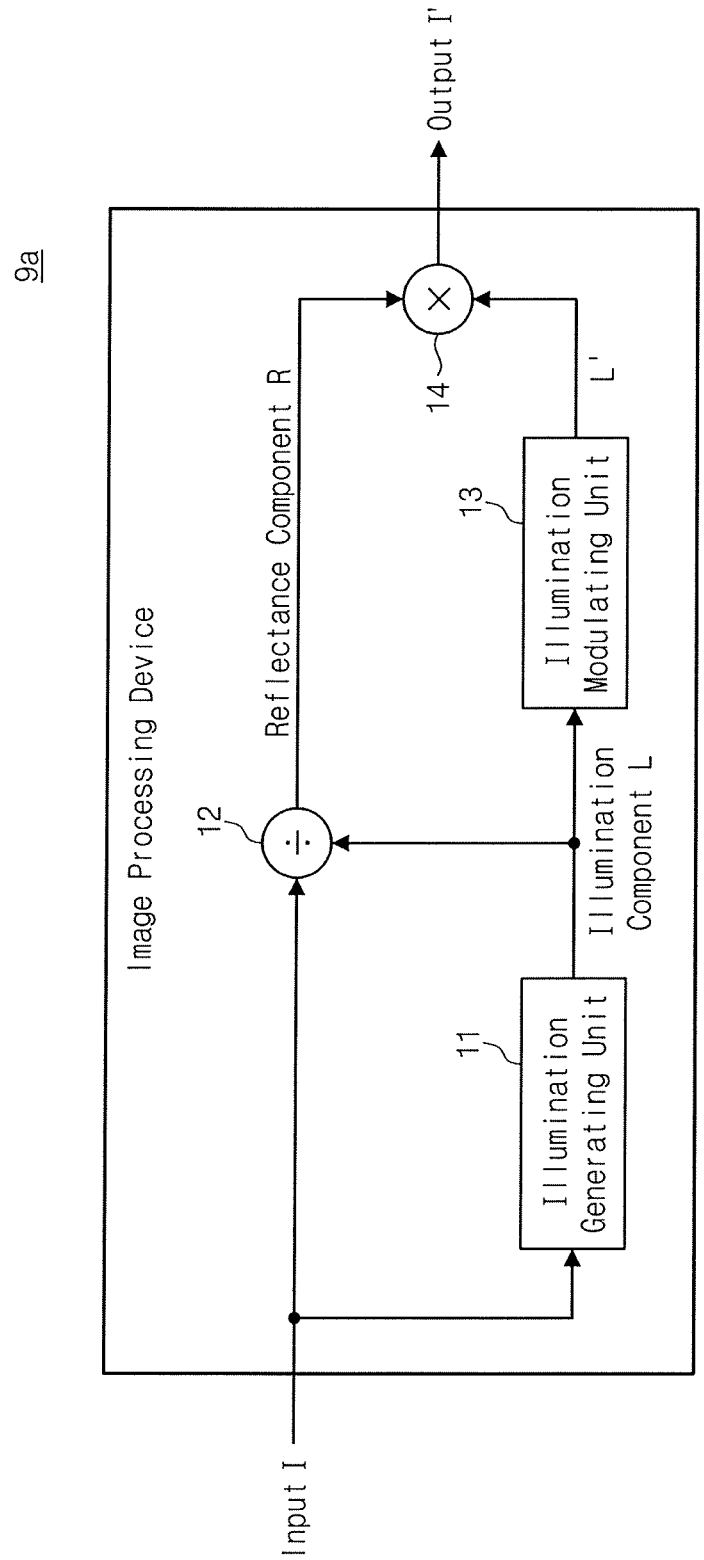
FIG. 1 is a schematic block diagram illustrating an exemplary configuration of an image processing device using the Retinex theory.

Exemplary embodiments of the inventive concept will be described below in detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

Throughout the specification and drawings, like reference numerals may refer to elements having substantially like functional configurations to omit overlapping description.

Hereinafter, exemplary embodiments of the inventive concept will be described in detail with reference to the accompanying drawings.

Firstly, image processing using the Retinex theory will be briefly described for better understanding of characteristics of an image processing device according to an embodiment of the inventive concept.

Typically, when an image is captured by a capturing device such as a digital still camera, there are cases where a brightness range of captured natural light exceeds a dynamic range of a capturing element provided in the capturing device. Accordingly, among capturing devices, there is a capturing device for capturing a subject image of which a brightness range is wider than a dynamic rage thereof by using a so-called dynamic range compression technique such as a backlight compensation technique or a high dynamic range (HDR) technique. In a capturing device using a dynamic range compression technique, capturing a subject image, where a brightness range is wider than a dynamic range of a capturing device, is enabled by lowering a range of any one or both of black and white points of a captured image.

Like this, as a technique for improving visibility of a captured image of which a so-called dynamic range is lowered, a technique performs local dynamic range compensation using the Retinex theory.

In detail, according to the Retinex theory, captured light in an image is considered as multiplication of an illumination component and a reflectance component. In other words, when the illumination component is L and the reflectance component is R, a brightness component I of an input image is expressed as the following Equation (1).

$$I = L \times R \qquad (1)$$

When the local dynamic range compensation is performed using the Retinex theory, the image processing device separates the illumination component L and reflectance component R from the brightness component I of the input image to process the separated components. Hereinafter, the brightness component I of the input image may be written as "input I" in some cases.

Referring to FIG. 1, a description will be provided for an exemplary configuration of an image processing device (hereinafter, "image processing device using the Retinex theory") for performing local dynamic range compensation using the Retinex theory. FIG. 1 is a block diagram illustrating an exemplary configuration of an image processing device 9a using the Retinex theory.

As illustrated in FIG. 1, the image processing device 9a includes an illumination generating unit 11, a dividing unit 12, an illumination modulating unit 13, and a multiplying unit 14.

The illumination generating unit 11 generates an illumination component L based on an input I. In detail, the illumination generating unit 11 generates the illumination component L from the input I by performing smoothing (e.g. applying a smoothing filter) on the input I. In addition, the illumination generating unit 11 outputs data representing the generated illumination component L to the dividing unit 12 and the illumination modulating unit 13.

The divider 12 generates a reflectance component R from the input I. In detail, the dividing unit 12 obtains the data representing the illumination component L from the illumination generating unit 11 and calculates the reflectance component R by dividing the input I by the obtained illumination component L according to Equation (1). In addition, the dividing unit 12 outputs data representing the calculated reflectance component R to the multiplying unit 14.

The illumination modulating unit 13 obtains the data for the illumination component L generated based on the input I from the illumination generating unit 11. The illumination modulating unit 13 generates a new illumination component L' (e.g., the illumination component L' that may result from locally modulating the illumination component L) by performing local modulation on the illumination component L.

Here, an image captured by the captured device may have a compressed dynamic range where a dynamic range of the black point is lowered. Therefore, the illumination modulating unit 13 may perform local modulation on the illumination component L so that the dynamic range is increased for the input image, in particular, for the black point. In this case, the illumination component after modulation L' may be calculated based on a relation expressed as the following Equation (2), where an enhancement amount for increasing the dynamic range is G. Hereinafter, the enhancement amount G for modulating the illumination component L may be written as "illumination enhancement coefficient G".

$$L' = \frac{\log(G \cdot L + 1)}{\log(G + 1)} \qquad (2)$$

In addition, the illumination modulating unit 13 outputs data representing the generated new illumination component L' to the multiplying unit 14.

The multiplying unit 14 multiplies to re-synthesize the reflectance component R output from the dividing unit 12 and the illumination component L' (e.g., a component where the illumination component L is locally modulated) output from the illumination modulating unit 13. In addition, the multiplying unit 14 outputs, as an output image, an image with brightness I' that is generated by re-synthesizing the reflectance component R with the modulated illumination component L'.

As in the foregoing, the image processing device 9a generates an image to output for which a local dynamic range of an input image is compensated. By compensating the local dynamic range of the input image, the dynamic range that has been lowered for a black or white point is increased to improve visibility of the black or white point. Hereinbefore, an exemplary functional configuration of the image processing device 9a using the Retinex theory has been explained with reference to FIG. 1.

With reference to FIG. 1, the image processing device 9a using Retinex performs local dynamic range compensation and improves visibility of the black or white point by modulating only the illumination component L.

Furthermore, the image processing device 9a described in relation to FIG. 1 extracts the illumination component L by applying a smoothing filter under an assumption that the illumination in the image is smoothly modulated, but it may not be always said that the extracted illumination component L has high fidelity. In other words, there are cases where the image processing device 9a described in relation to FIG. 1 may not perfectly separate the illumination component L from the reflectance component R. A phenomenon like this may more markedly appear as a reference pixel range becomes smaller at the time of extracting the illumination component L.

Figure 2:
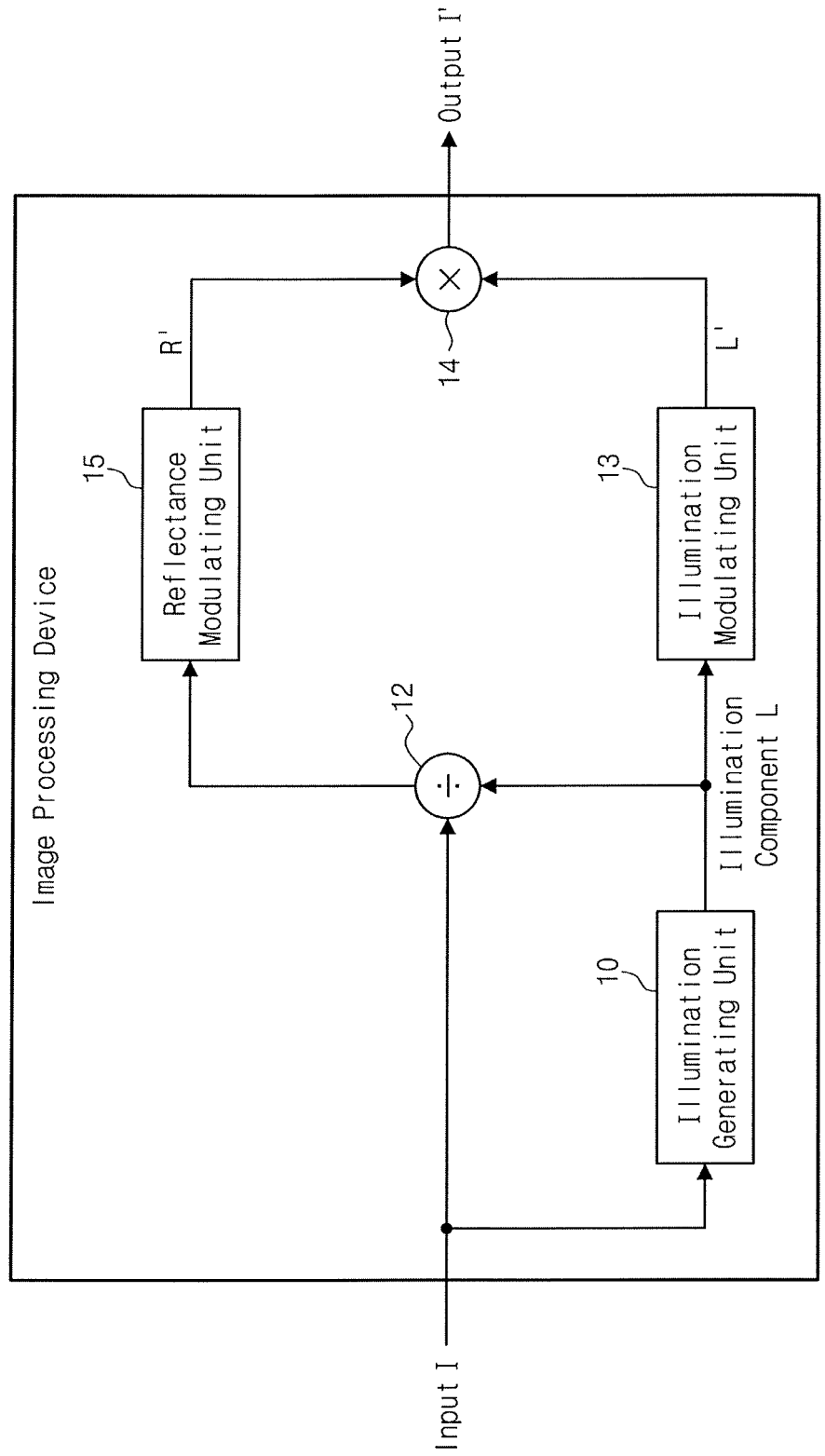
FIG. 2 is a schematic block diagram illustrating an exemplary configuration of an image processing device using the Retinex theory.

Considering this limitation, for image processing devices using the Retinex theory, a device for improving quality of display may do so by modulating the reflectance component R in addition to modulating the illumination component L. Hereinafter, referring to FIG. 2 as an exemplary configuration of an image processing device using the Retinex theory, a description will be provided for an exemplary configuration of an image processing device capable of improving quality of display by additionally modulating the reflectance component R. FIG. 2 is a block diagram illustrating an exemplary configuration of an image processing device using the Retinex theory.

An image processing device 9b illustrated in FIG. 2 is different from the image processing device 9a described in relation to FIG. 1 in that the image processing device 9b includes a reflectance modulating unit 15. To avoid duplicative description, characteristics of the image processing device 9b will be described herein by focusing on the parts that are different from the image processing device 9a described in relation to FIG. 1.

In the image processing device 9b illustrated in FIG. 2, the reflectance component R output from the dividing unit 12 is input to the reflectance modulating unit 15. The reflectance modulating unit 15 generates a new reflectance component R' (e.g., a component in which the reflectance component R is modulated) by modulating the input reflectance component R. In addition, when an enhancement amount is Y, the reflectance component after modulation R' is calculated based on the following Equation (3). Hereinafter, cases where the enhancement amount Y for modulating the reflectance R may be written as "reflection enhancement coefficient Y".

$$R' = R^Y \quad (3)$$
$$= \left(\frac{I}{L}\right)^Y$$

In addition, the reflectance modulating unit 15 outputs data representing the new reflectance component R' to the multiplying unit 14.

The multiplying unit 14 multiplies to re-synthesize the reflectance component R' output from the reflectance modulating unit 15 and the illumination component L' output from the illumination modulating unit 13. In addition, the multiplying unit 14 outputs, as an output image, an image with brightness I', which is generated by re-synthesizing the reflectance component R' and the illumination component L'.

Here, when the brightness component I' (e.g., an output I') is generated by re-synthesizing the reflectance component after modulation R' and illumination component after modulation L', the output I' is calculated according to the relation expressed by the following Equations (4) and (5) on the basis of Equations (2) and (3). In addition, in Equation (4), G denotes the foregoing illumination enhancement coefficient, and Y denotes the foregoing reflectance enhancement coefficient. In addition, in Equation (5), $W_{LPF}$ denotes a filter coefficient of a smoothing filter for extracting the illumination L from the brightness component I of the input image.

$$I' = L' \times R' \quad (4)$$
$$= \frac{\log(G \cdot L + 1)}{\log(G + 1)} \times \left(\frac{I}{L}\right)^Y$$
$$= \exp\{\log L' + \gamma(\log I - \log L)\}$$

$$L = I \otimes W_{LPF} \quad (5)$$

Referring to Equations (4) and (5), when the reflectance component R' and the illumination component L' are re-synthesized to generate the output I', Equation (4) for the output I' includes an algebraic function, exponential function, and division.

Here, a circuit for realizing the algebraic function, exponential function, and division may be large in size. In particular, the algebraic function or exponential function may be realized by using numerical transformation with a lookup table (LUT), and realizing the LUT further consumes resources such as a memory and the like. Therefore, an image processing device using the Retinex theory may be large in circuit size. In particular, like the image processing device 9b illustrated in FIG. 2, the circuit size may be further increased in a case where modulation is also performed on the reflectance component R.

In particular, although an image processing technique using the Retinex theory may be applied to a portable small terminal such as a smartphone, the size of a circuit embedded therein is limited.

Like the image processing device 9b illustrated in FIG. 2, when the reflectance component R' is generated by modulating the reflectance component R, a noise component may be enhanced by the modulation of the reflectance component R to result in degradation in quality of display.

Figure 3:
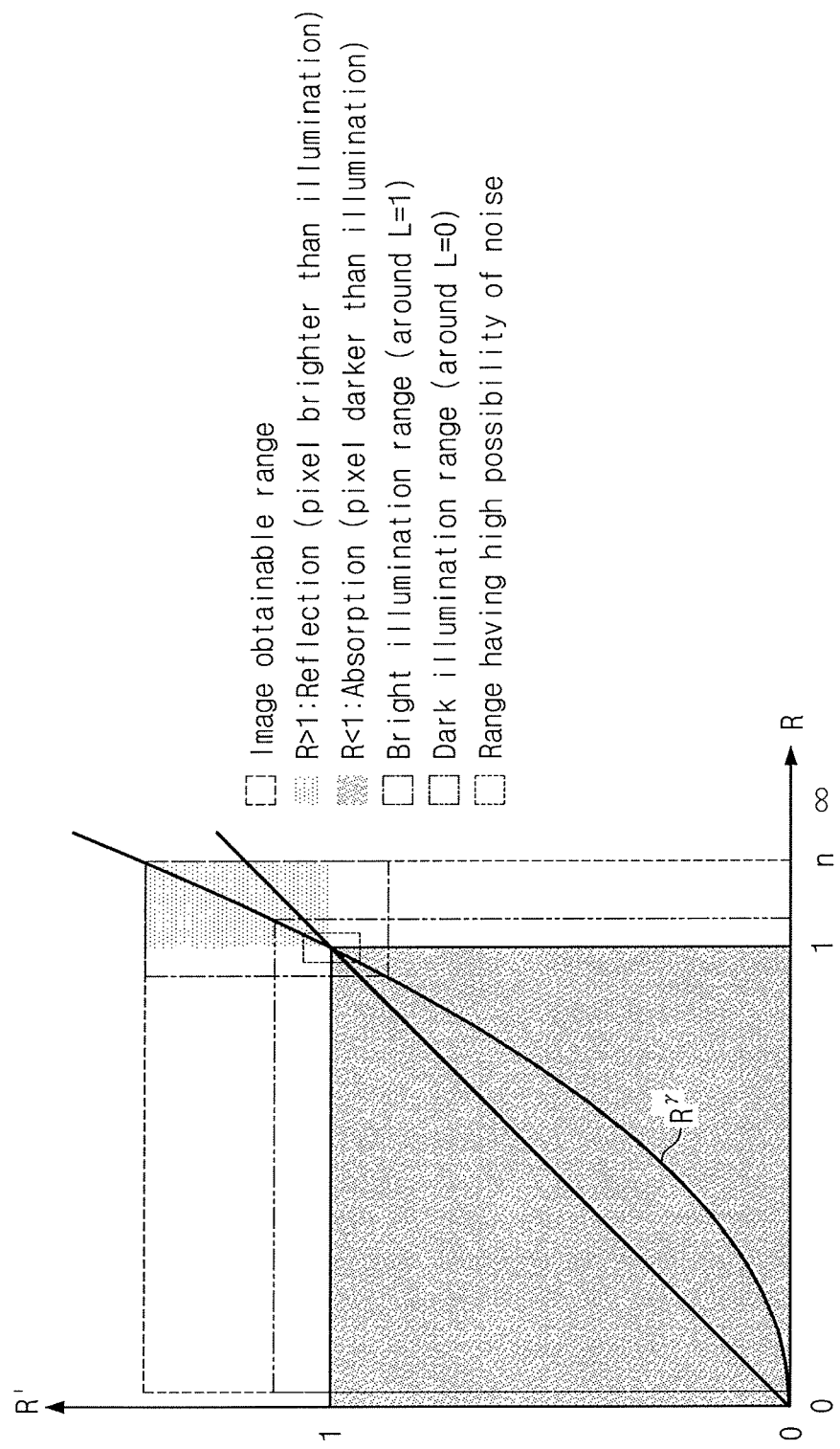
FIG. 3 is a graphical diagram illustrating an exemplary relation between a reflectance component and a reflectance component after modulation.

For example, FIG. 3 is a diagram for explaining an exemplary noise component that may appear with modulation of the reflectance component R, and illustrates an exemplary relation between the reflectance component R and the reflectance component R' after modulation. In FIG. 3, a horizontal axis denotes the reflectance component R and a vertical axis denotes the reflectance component R' after modulation.

Referring to Equations (1) and (3), the reflectance component R is calculated by dividing a brightness component I of an input image by the illumination component L. In other words, when the brightness component I of the input image is smaller than the illumination component L (hereinafter, "at the time of absorption" in some cases), the reflectance component R has a value smaller than 1. On the other hand, when the brightness component I of the input image is greater than the illumination component L (hereinafter, "at the time of reflection" in some cases), the reflectance component R has a value greater than 1. At this point, the reflectance component may be only a positive value. Here, since the brightness component I of the input image has a finite length, the relation between the reflectance component R and the reflectance component after modulation R' becomes as illustrated in FIG. 3.

Referring to FIG. 3, when the reflectance component R is modulated, the reflectance component after modulation R' is generated by performing reflectance enhancement (for example, contrast enhancement) so that a degree of reflection becomes higher at the time of reflection and a degree of absorption becomes higher at the time of absorption.

However, as illustrated in FIG. 3, in cases of reflection and absorption, an excessive enhancement characteristic is not a target. The reflectance component R of low noise, such as a noise floor included at the time of capturing an image, may be a value around 1. Here, as shown in FIG. 3, when the reflectance component R is around 1, a graph representing a relation between the reflectance component R and the reflectance component after modulation R' has a steeper slope than a graph of a case (e.g., R=R') where the reflectance component R and the reflectance component R' is substantially the same. In other words, since the reflectance component R having a value of around 1 is an enhancement target, a noise component thereof is enhanced, and consequently, the noise component comes to the surface and degradation in quality of display may result.

In addition, the image processing devices 9a and 9b described in relation to FIGS. 1 and 2 determine a degree of modulation for the extracted illumination component L regardless of an element in the input image without a local characteristic added to the input image. Therefore, when a part (hereinafter, "pattern style"), where brightness (e.g., gradation) is changed by the pattern of a subject, is focused upon, modulation is performed on the illumination component L regardless of the density of the pattern. Under this situation, for example, when modulation (or enhancement)

is performed by an enhancement amount substantially identical to the pattern style with respect to the dense pattern style, the pattern may be excessively enhanced (e.g., contrast thereof is excessively enhanced) and becomes an unnatural appearing image.

At least one embodiment of the inventive concept is derived by considering the above-described limitation. Firstly, a description will be provided about an exemplary image processing device capable of further reducing the size of a circuit for realizing image processing using the Retinex theory. A description will be provided about another exemplary image processing device capable of suppressing a noise component from coming to the surface. In addition, a description will be provided about an exemplary embodiment image processing device capable of substantially suppressing degradation of display quality according to the modulation of illumination component L by controlling an enhancement amount according to a local characteristic of an input image.

Firstly, a description will be provided about an exemplary image processing device capable of further reducing the size of a circuit for realizing image processing using the Retinex theory.

In an image processing device according to the present embodiment, local dynamic compensation is achieved without calculating the reflection component R by using an illumination enhancement coefficient $K_{LG}$ that represents a ratio between the illumination component before modulation L and the illumination component after modulation L'. Here, for easily understanding the characteristics of the image processing device according to the present embodiment, firstly, a description will be provided about a principle of local dynamic range compensation using the illumination enhancement coefficient $K_{LG}$.

Firstly, when the modulation is performed only on the illumination component L, an output I' generated by re-synthesizing the reflection component R and the illumination component after modulation L' is transformed to the following Equation (6) using an illumination enhancement coefficient $K_{LG}$ on the basis of the foregoing Equation (1).

$$\begin{aligned} I' &= L' \times R \\ &= L' \times \left(\frac{I}{L}\right) \\ &= \frac{L'}{L} \times I \\ &= K_{LG} \times I \end{aligned} \quad (6)$$

Referring to Equation (6), the output I' may be obtained when the local dynamic range compensation is performed by multiplying the illumination enhancement coefficient $K_{LG}$ by the brightness component I of the input image.

Figure 4:
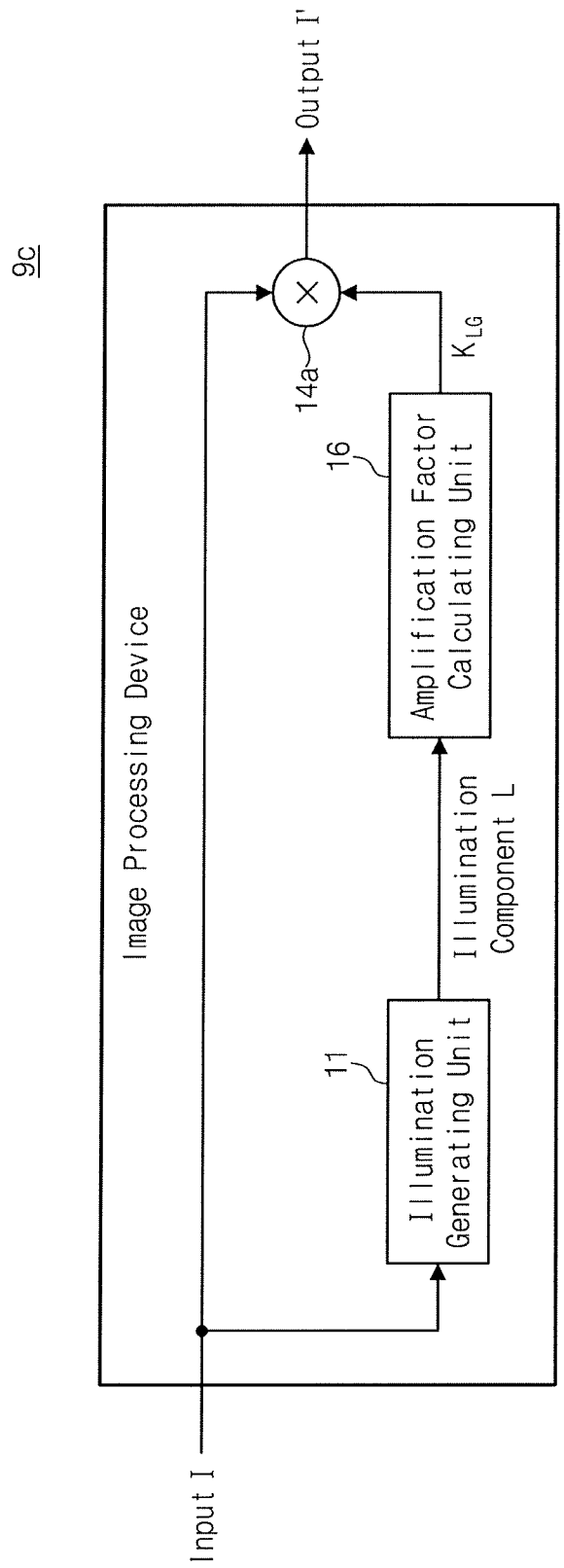
FIG. 4 is a schematic block diagram illustrating an exemplary configuration of an image processing device for performing local dynamic range compensation by using an illumination enhancement coefficient.

For example, FIG. 4 illustrates an exemplary configuration of an image processing device 9c capable of realizing local dynamic range compensation by using the illumination enhancement coefficient $K_{LG}$.

The image processing device 9c illustrated in FIG. 4 includes an illumination generating unit 11, a multiplying unit 14a, and an amplification factor calculating unit 16. In addition, the illumination generating unit 11 may be the same as the illumination generating unit 11 of the image processing devices 9a and 9b illustrated in FIGS. 1 and 2. The illumination generating unit 11 generates the illumination component L on the basis of an input I and outputs data representing the generated illumination component L to the amplification factor calculating unit 16.

The amplification factor calculating unit 16 obtains the illumination component L from the illumination generating unit 11 and calculates the illumination enhancement coefficient $K_{LG}$ on the basis of the obtained illumination component L. In addition, a method for calculating the illumination enhancement coefficient $K_{LG}$ on the basis of the illumination component L will be described for a configuration of an image processing device according to an embodiment of the inventive concept.

The amplification factor calculating unit 16 outputs the illumination enhancement coefficient $K_{LG}$, which is calculated based on the illumination component L, to the multiplying unit 14a. The multiplying unit 14a multiplies the input I and the illumination enhancement coefficient $K_{LG}$, which is output from the amplification factor unit 16, and outputs the multiplication result as the output I'.

When it is possible to calculate the illumination enhancement coefficient $K_{LG}$ according to the foregoing configuration, it is also possible to consider that the output of the image processing device 9a illustrated in FIG. 1 may be substantially the same as that of the image processing device 9c illustrated in FIG. 4. Here, as shown in FIG. 4 or Equation (6), the image processing device 9c may perform the local dynamic range compensation without deriving the reflectance component R. In other words, according to the image processing device 9c illustrated in FIG. 4, it is possible to perform the local dynamic range compensation without requiring division that might otherwise be a cause for increasing the circuit size, and it is also possible to reduce the circuit size compared to the image processing device 9a illustrated in FIG. 1.

Here, when a difference between the input I and the illumination component L is a reflection-absorption component $L_R$, the foregoing Equation (6) is transformed to the following Equation (7).

$$\begin{aligned} I' &= K_{LG} \times I \\ &= K_{LG} \times (L + L_R) \\ &= K_{LG} \times L + K_{LG} \times L_R \\ &= K_{BR-G} \times L + K_{CR-G} \times L_R \end{aligned} \quad (7)$$

In Equation (7), coefficients $K_{BR-G}$ and $K_{CR-G}$ are coefficients into which the illumination enhancement coefficient $K_{LG}$ is divided in order to individually control the illumination component L and the reflection-absorption component $L_R$. In other words, in Equation (7), when the coefficients $K_{BR-G}$ and $K_{CR-G}$ are controlled to be $K_{BR-G}=K_{CR-G}$, the Equation (7) operates as Equation (6).

Here, the coefficient $K_{BR-G}$ is a coefficient for being multiplied by the illumination component L to modulate the illumination component L and generate the illumination component after modulation L'. When each pixel of the input image is a pixel of interest, the illumination component L is an average value of brightness components of adjacent pixels positioned around the pixel of interest and the brightness component I of the pixel of interest may be considered as a DC component. In other words, adjusting the illumination component L means adjusting the brightness within a range for which a substantially identical illumination component is shared. Hereinafter, the coefficient $K_{BR-G}$ for modulating the illumination component L may be written as a brightness enhancement coefficient $K_{BR-G}$ in some cases.

In addition, the coefficient $K_{CR-G}$ is a coefficient for being multiplied by the reflection-absorption component $L_R$ to modulate the reflection-absorption component $L_R$ and generate the reflection-absorption component after modulation $L_R'$. The reflection-absorption component $L_R$ is a difference amount between the illumination component L and brightness component I of the pixel of interest. When the illumination component L is considered as a DC component, the reflection-absorption component $L_R$ may be considered as an AC component. In other words, the reflection-absorption component $L_R$ may also be considered as a contrast component, and adjusting the reflection-absorption component $L_R$ corresponds to adjusting the contrast. Hereinafter, the coefficient $K_{CR-G}$ for modulating the reflection-absorption component $L_R$ may be written as a contrast enhancement coefficient $K_{CR-G}$ in some cases.

In the image processing device according to the embodiment, the brightness component I of the input image is considered as a sum of the illumination component L and the reflection-absorption component $L_R$, and each component is modulated with the brightness enhancement coefficient $K_{BR-G}$ and contrast enhancement coefficient $K_{CR-G}$. In addition, the image processing device according to the embodiment obtains the output I' by summing the illumination component after modulation L' and the reflection-absorption component $L_R$.

On the basis of this configuration, the image processing device according to the embodiment enables realization of local dynamic range compensation (e.g., local dynamic range compensation output substantially identical to that of the image processing device 9b illustrated in FIG. 2) based on Equation (7).

Figure 5:
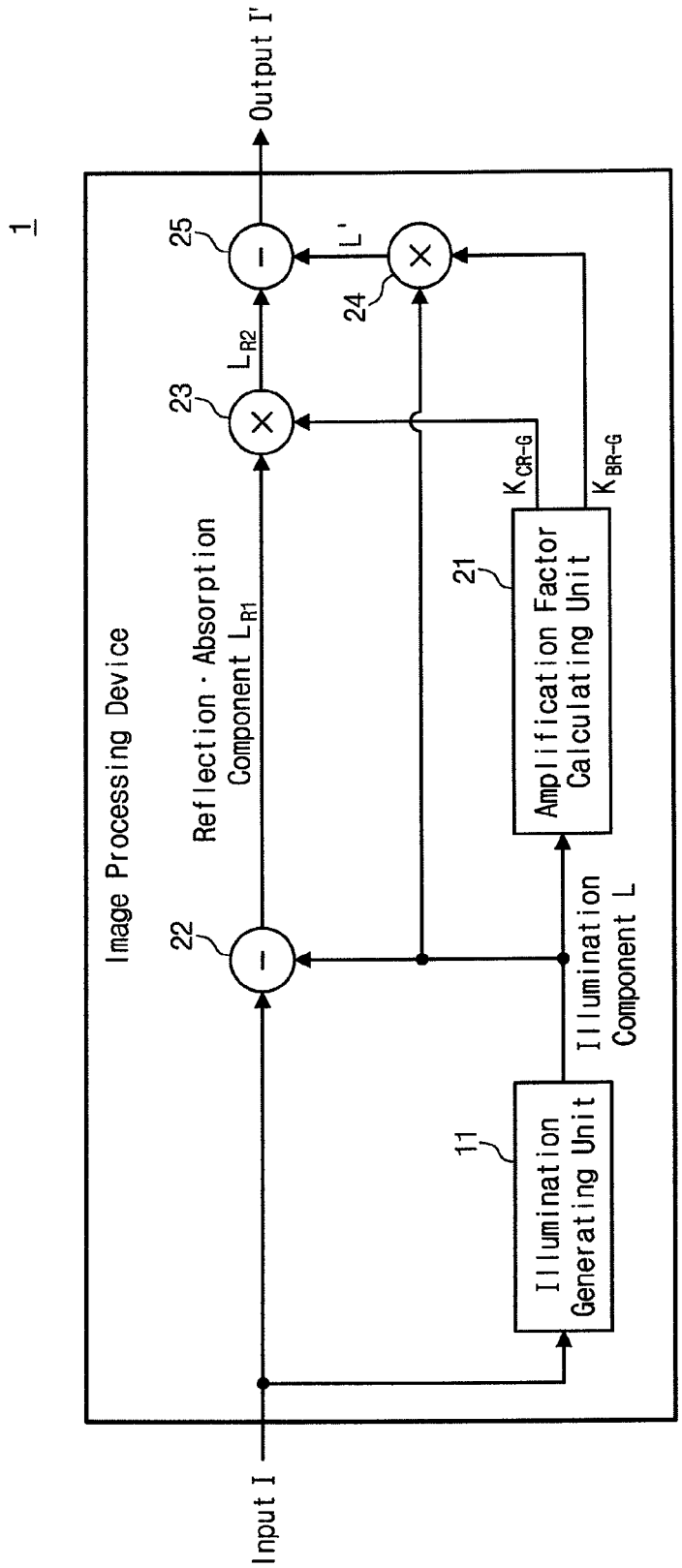
FIG. 5 is a schematic block diagram illustrating an exemplary configuration of an image processing device according to an embodiment of the inventive concept.

An image processing device 1 according to the embodiment will be described with reference to FIG. 5. FIG. 5 is a block diagram illustrating an exemplary configuration of an image processing device according to an embodiment of the inventive concept.

As illustrated in FIG. 5, the image processing device 1 according to the embodiment includes an illumination generating unit 11, an amplification factor calculating unit 21, a subtracting unit 22, multiplying units 23 and 24, and an adding unit 25.

In addition, the illumination generating unit 11 is the same as the illumination generating unit 11 of the image processing devices 9a and 9b illustrated in FIGS. 1 and 2 and a description thereabout will be omitted. The illumination generating unit 11 generates an illumination component L on the basis of an input I and outputs data representing the generated illumination component L to the amplification factor calculating unit 21, subtracting unit 22, and multiplying unit 24.

The subtracting unit 22 generates the reflection-absorption component $L_{R1}$ on the basis of the input I. In detail, the subtracting unit 22 obtains, from the illumination generating unit 11, data representing the illumination component L generated based on the brightness component I of a pixel of interest where the pixel of interest is sequentially selected from pixels in the input image. The subtracting unit 22 calculates the reflection and absorption component $L_{R1}$ by subtracting the obtained illumination component L corresponding to the pixel of interest from the brightness component I of the pixel of interest. In addition, the subtracting unit 22 outputs data representing the calculated reflection-absorption component $L_{R1}$ to the multiplying unit 23 for each pixel of interest.

The amplification factor calculating unit 21 calculates the brightness enhancement coefficient $K_{BR-G}$ and contrast enhancement coefficient $K_{CR-G}$ on the basis of the illumination component L of the pixel of interest for each pixel of interest of the input image. In addition, the amplification factor calculating unit 21 corresponds to the amplification calculating unit 16 in the image processing device 9c illustrated in FIG. 4.

Here, in an exemplary method for calculating the brightness enhancement coefficient $K_{BR-G}$ and contrast enhancement coefficient $K_{CR-G}$, the illumination enhancement coefficient $K_{LG}$, which is a basis of the coefficients $K_{BR-G}$ and $K_{CR-G}$, will be described in detail. When a transformation function for transforming the illumination component L to the illumination component after modulation L' is f(L), the transformation function f(L) is expressed as the following Equation (8) on the basis of Equation (2), which represents a relation between the illumination component L and the illumination component after modulation L'.

$$f(L) = \frac{\log(G \cdot L + 1)}{\log(G + 1)} \qquad (8)$$

Figure 6:
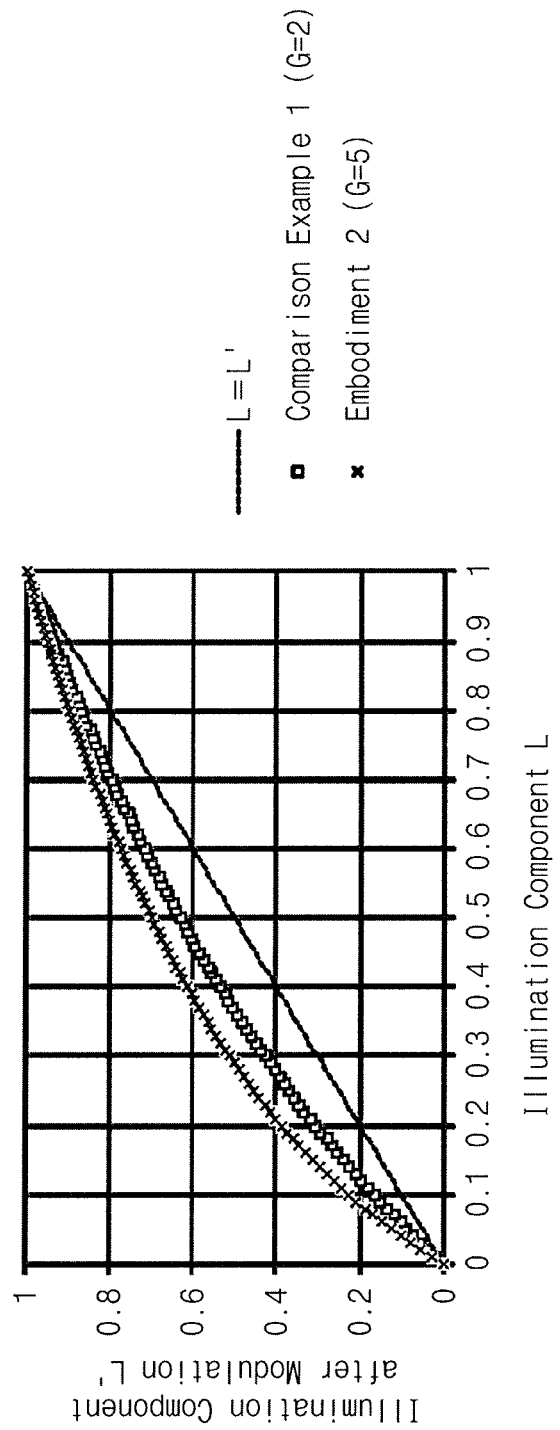
FIG. 6 is a graphical diagram illustrating an exemplary relation between an illumination component and an illumination component after modulation.

For example, FIG. 6 is a graph representing an exemplary relation between the illumination component L and the illumination component after modulation L', where plots are shown for G=2 and G=5 in Equation (8). In FIG. 6, a horizontal axis denotes the illumination component L and a vertical axis denotes the illumination component after modulation L'. In other words, FIG. 6 represents a calculation result that is obtained by sequentially changing the illumination component L from 0 to 1 when G=2 and G=5, and by calculating the illumination component after modulation L' for each illumination component L on the basis of Equation (8). In addition, in FIG. 6, comparison example 1 represents an exemplary relation between the illumination component L and the illumination component after modulation L', when G=2. In addition, comparison example 2 represents an exemplary relation between the illumination component L and the illumination component after modulation L', when G=5.

Figure 7:
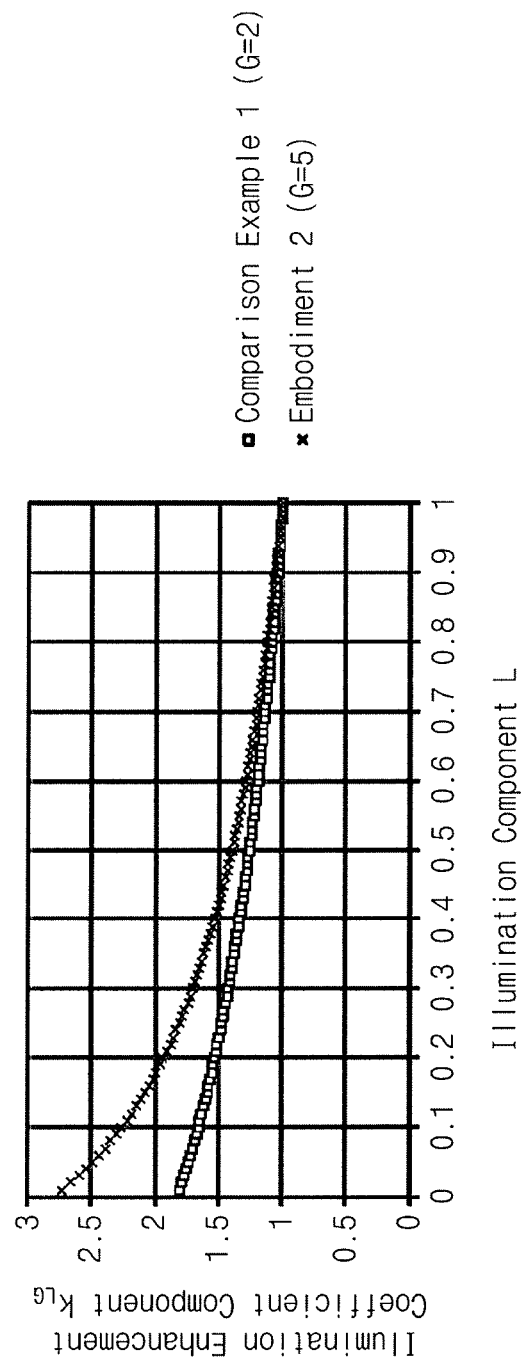
FIG. 7 is a graphical diagram illustrating an exemplary relation between an illumination component and an illumination enhancement coefficient.

The illumination enhancement coefficient $K_{LG}$ is represented as L'/L on the basis of Equation (6). Here, when $K_{LG}$=L'/L, a graph, which represents an example of the relation between the illumination component L and the illumination component after modulation L' illustrated in FIG. 6, is transformed to a graph representing a relation between the illumination component L and the illumination enhancement coefficient $K_{LG}$ as illustrated in FIG. 7. FIG. 7 is a graph illustrating an exemplary relation between an illumination light component and an illumination highlight component. In FIG. 7, a horizontal axis denotes the illumination component L and a vertical axis denotes the illumination enhancement coefficient $K_{LG}$. In addition, similar to the example of FIG. 6, the comparison example 1 corresponds to a case where G=2, and the comparison example 2 corresponds to a case where G=5.

Here, like an image captured by a capturing device, when local modulation is performed on an image of which a dynamic range is compressed in order to increase the dynamic range, a relation between the illumination component L and the illumination component after modulation L' becomes L'≥L. Thus, when the relation between the illumination component L and the illumination component after modulation L' is L'≥L, the illumination enhancement coefficient $K_{LG}$ has a value of 1 or greater. In addition, as illustrated in FIG. 7, the illumination enhancement coefficient $K_{LG}$ represents a characteristic of being exponentially attenuated according to the increase in illumination component L.

As described above, a numerical transformation with a look-up table (LUT), which is used to realize an exponential function, may be a cause of large circuit size. Here, the amplification factor calculating unit 21 represents a relation between the illumination component L and the illumination enhancement coefficient $K_{LG}$ illustrated in FIG. 7 with an approximate equation, and transforms the illumination component L into the illumination enhancement coefficient $K_{LG}$ according to the approximate equation to reduce the size of the circuit for realizing the transformation. For example, the following Equation (9) is an exemplary approximate equation representing the relation between the illumination component L and the illumination enhancement coefficient $K_{LG}$.

$$K_{LG}=\text{gain}\{\text{slope3}(1-L)^3+\text{slope2}(1-L)^2+\text{slope1}(1-L)\}+\text{offset 1}=\text{slope3}+\text{slope2}+\text{slope1} \quad (9)$$

In the approximate equation represented as Equation (9), a gain, slope 1 to slope 3, and an offset are coefficients for adjusting the approximate equation, and are preset to approximate the pre-calculated relation between the illumination component L and illumination enhancement coefficient $K_{LG}$.

Figure 8:
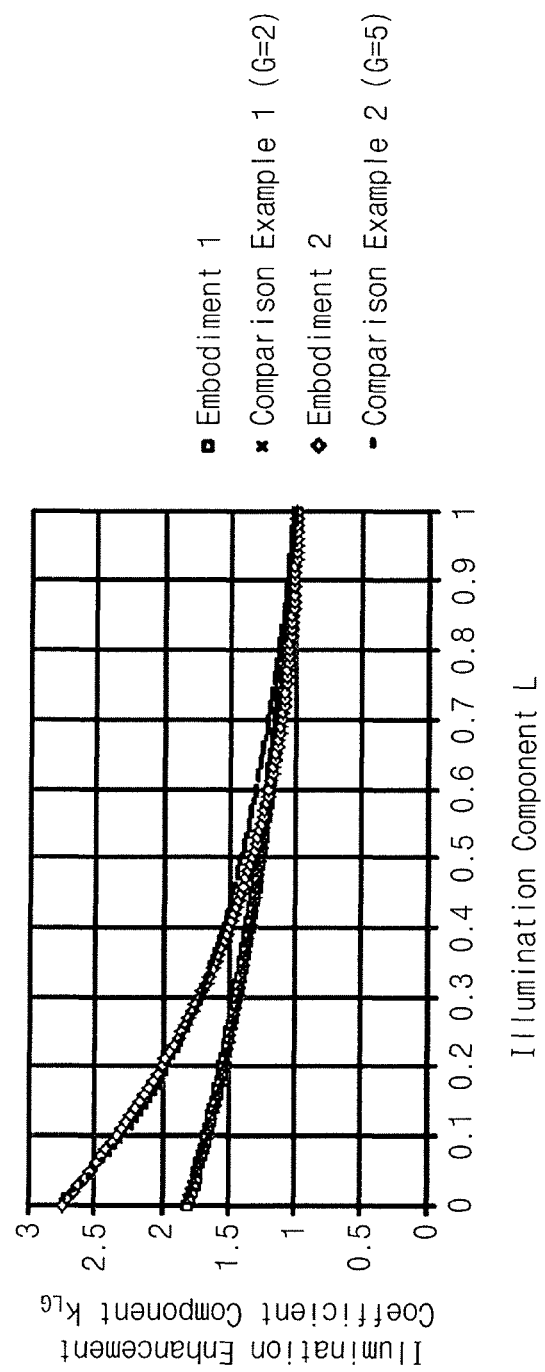
FIG. 8 is a graphical diagram illustrating an exemplary relation between an illumination component and an illumination enhancement coefficient.

For example, FIG. 8 is a graph illustrating an exemplary relation between the illumination component L and illumination enhancement coefficient $K_{LG}$, and illustrates a relation between the illumination component L and illumination enhancement coefficient $K_{LG}$, which is calculated based on Equation (9).

In FIG. 8, the graph illustrated for an embodiment 1 corresponds to a case where coefficient values are set as gain=0.8, slope1=0.5, slope2=0.2, slope3=0.3, and offset=1.0 in Equation (9). In addition, the embodiment 1 corresponds to the approximate equation of a case where G=2 in Equation (8) (in other words, the comparison example 1 in FIG. 7).

In addition, the graph illustrated as the embodiment 2 corresponds to a case where the coefficient values are set as gain=1.75, slope1=0.05, slope2=0.35, slope3=0.6, and offset=1.0 in Equation (9). In addition, the embodiment 2 corresponds to the approximate equation of a case where G=5 in Equation (8) (in other words, the comparison example 2 in FIG. 7).

In addition, as an example of a relation between the illumination component L and the illumination enhancement coefficient $K_{LG}$ on the basis of Equation (8), FIG. 8 jointly shows a graph for a case where G=2 (e.g., the comparison example 1 in FIG. 7) and a case where G=5 (e.g., the comparison example 2 in FIG. 7).

As illustrated in FIG. 8, although having some errors in the characteristic in a part where the illumination component L is large (e.g., a white point), the embodiments 1 and 2, and the comparison examples 1 and 2 satisfactorily approximate a part where the illumination component L is small (e.g., a black point). As described above, the image captured by the capture device has a compressed dynamic range where the dynamic range of the black point is lowered. Thus, in local dynamic range compensation for the image, the dynamic range of the black point thereof is largely increased and the dynamic range of the white point is not largely increased. In this case, the foregoing small error in white point scarcely influences degradation in quality of display.

Furthermore, the approximation equation expressed as Equation (9) is formed only with a cube function and a square function, either or both of which may be implemented with multiplication, multiplication, and division, and enables the circuit size to be substantially smaller than a case where an equation including the algebraic function, exponential function, and division like Equation (8) is realized.

In addition, the approximate equation expressed as Equation (9) is just an example and content thereof is not limited, when the relation between the illumination component L and illumination enhancement coefficient $K_{LG}$ based on Equation (8) is approximated. As a detailed example, the approximate equation may be derived based on a Taylor series on the basis of a graph representing the relation between illumination component L and illumination enhancement coefficient $K_{LG}$.

Based on the approximate equation expressed as Equation (9), a dynamic range compensation using the Retinex theory and brightness constancy is enabled by calculating the illumination enhancement coefficient $K_{LG}$ with the illumination component L as an input, and by applying the illumination enhancement coefficient $K_{LG}$ to Equation (6). Due to this, the visibility, in particular, for the black point, is improved.

Furthermore, in compensation based on the approximate equation expressed as Equation (9), since the brightness component is enhanced with the contrast component, when the input image is compared with a compensated image, the brightness may be entirely increased. In this case, although the brightness may be adjusted by limiting the illumination enhancement coefficient $K_{LG}$ to be low, the dynamic range compensation effect may be reduced.

Here, as expressed in Equation (7), the image processing device for Example 1 according to the embodiment enables an individual control on the brightness component (e.g., the illumination component L) and the contrast component (e.g., the reflection-absorption component $L_R$) by separating the illumination enhancement coefficient $K_{LG}$ into the brightness enhancement coefficient $K_{BR-G}$ and the contrast enhancement coefficient $K_{CR-G}$.

In detail, the amplification factor calculating unit 21 calculates the contrast enhancement coefficient $K_{CR-G}$ by applying Equation (9) to calculation of the contrast enhancement coefficient $K_{CR-G}$. In other words, the contrast enhancement coefficient $K_{CR-G}$ is calculated on the basis of the following Equation (10). In addition, in Equation (10), the coefficients cr_gain, cr_slope1~cr_slope3, and cr_offset correspond to the coefficients gain, slope1~slope3, and offset in Equation (9).

$$K_{CR-G}=cr\_\text{gain}\{cr\_\text{slope3}(1-L)^3+cr\_\text{slope2}(1-L)^2+cr\_\text{slope1}(1-L)\}+cr\_\text{offset1}=cr\_\text{slope3}+cr\_\text{slope2}+cr\_\text{slope1} \quad (10)$$

In addition, the brightness enhancement coefficient $K_{BR-G}$ is calculated based on the contrast enhancement coefficient $K_{CR-G}$. In detail, when a coefficient for adjusting a gain of the brightness component (e.g., illumination component L) is br_gain, the brightness enhancement coefficient $K_{BR-G}$ is calculated based on Equation (11).

$$K_{BR-G}=br\_\text{gain}(K_{CR-G}-cr\_\text{offset})+cr\_\text{offset} \quad (11)$$

As in the foregoing, the amplification factor calculating unit 21 calculates the brightness enhancement coefficient $K_{BR-G}$ and contrast enhancement coefficient $K_{CR-G}$ on the basis of the illumination component L of the pixel of interest for each pixel of interest of the input image. In addition, the amplification factor calculating unit 21 outputs the calculated contrast enhancement coefficient $K_{CR-G}$ for each pixel of interest to the multiplying unit 23. In addition, the amplification factor calculating unit 21 outputs the calculated brightness enhancement coefficient $K_{BR-G}$ for each pixel of interest to the multiplying unit 24.

The multiplying unit 23 modulates the reflection-absorption component $L_{R1}$. Hereinafter, the modulated reflection-absorption component $L_{R1}$ will be written as "reflection-absorption component after modulation $L_{R2}$" in some cases. In detail, the multiplying unit 23 obtains, from the amplification factor calculating unit 21, the contrast enhancement coefficient $K_{CR-G}$ calculated for each pixel of interest of the input image. The multiplying unit 23 modulates the reflection-absorption component $L_{R1}$ by multiplying the reflection-absorption component $L_{R1}$ output for each pixel of interest from the subtracting unit 22 by the contrast enhancement coefficient $K_{CR-G}$ corresponding to the obtained corresponding pixel of interest, and calculates the reflection-absorption component after modulation $L_{R2}$. In addition, the multiplying unit 23 outputs, to the adding unit 25, data representing the reflection-absorption component after modulation $L_{R2}$ calculated for each pixel of interest. In addition, the contrast enhancement coefficient $K_{CR-G}$ corresponds to an example of "a first coefficient", and the multiplying unit 23 corresponds to an example of "a first multiplying unit".

The multiplying unit 24 modulates the illumination component L. Hereinafter, the modulated illumination component L may be written "illumination component after modulation L'". In detail, the multiplying unit 24 obtains, from the amplification factor calculating unit 21, the brightness enhancement coefficient $K_{BR-G}$ calculated for each pixel of interest of the input image. The multiplying unit 24 modulates the illumination component L by multiplying the illumination component L output for each pixel of interest output from the illumination generating unit 11 by the brightness enhancement coefficient $K_{BR-G}$, and calculates the illumination component after modulation L'. In addition, the multiplying unit 24 outputs, to the adding unit 25, data representing the illumination component after modulation L' calculated for each pixel of interest. In addition, the brightness enhancement coefficient $K_{BR-G}$ corresponds to an example of "a second coefficient", and the multiplying unit 24 corresponds to an example of "a second multiplying unit".

The adding unit 25 adds the illumination component after modulation L' output from the multiplying unit 24 to the reflection-absorption component after modulation $L_{R2}$ output from the multiplying unit 23. In addition, the adding unit 25 outputs, as an output image, an image based on the brightness component L', which is generated by adding the illumination component after modulation L' to the reflection-absorption component after modulation $L_{R2}$.

As expressed in Equation (7), the illumination component L is modulated based on the brightness enhancement coefficient $K_{BR-G}$, and the reflection-absorption component $L_{R1}$ is modulated based on the contrast enhancement coefficient $K_{CR-G}$. In addition, with the illumination component after modulation and the reflection-absorption component $L_{R2}$ added together, an output image is obtained where local dynamic range compensation is performed on the input image.

In addition, in a relation equation for calculating the brightness enhancement coefficient $K_{BR-G}$ with Equation (11), when a coefficient br_gain=1, a local dynamic range compensation is performed using the Retinex theory and brightness constancy. In addition to the local dynamic range compensation using the Retinex theory and brightness constancy, when the coefficient br_gain<1, it is possible to obtain a contrast enhancement effect and realize image compensation of which visibility and resolution are improved. In addition, when the coefficient br_gain is adjusted in Equation (11), the coefficients cr_gain and cr_slope1 to cr_slope3 may be adjusted according to the adjustment of the br_gain.

As described above, the image processing device 1 according to an embodiment of the inventive concept calculates the reflection-absorption component $L_R$ on the basis of a difference between the input I and the illumination component L, and modulates the illumination component L and the reflection-absorption component $L_R$ on the basis of the brightness enhancement coefficient $K_{BR-G}$ and contrast enhancement coefficient $K_{CR-G}$ calculated according to the illumination component L.

In addition, the image processing device 1 calculates the illumination enhancement coefficient $K_{LG}$ on the basis of the illumination component L by approximating a relation between the illumination component L and illumination enhancement coefficient $K_{LG}$ (in other words, the brightness enhancement coefficient $K_{BR-G}$ and contrast enhancement coefficient $K_{CR-G}$) according to Equation (8) on the basis of the approximate equation of Equation (9).

According to the foregoing configuration, the image processing device 1 according to the embodiment may perform the local dynamic range compensation by excluding an equation that may be a cause of increase in circuit size such as an algebraic function, exponential function, or division. Due to this, the image processing device 1 of FIG. 5 derives the reflectance component R by dividing the input I by the illumination component L, and enables the circuit size to be smaller than a configuration for modulating each of the illumination component R and reflectance component R A description will be provided for an exemplary image processing device capable of suppressing a noise component (in particular, low noise such as a noise floor) from coming to the surface.

Figure 9:
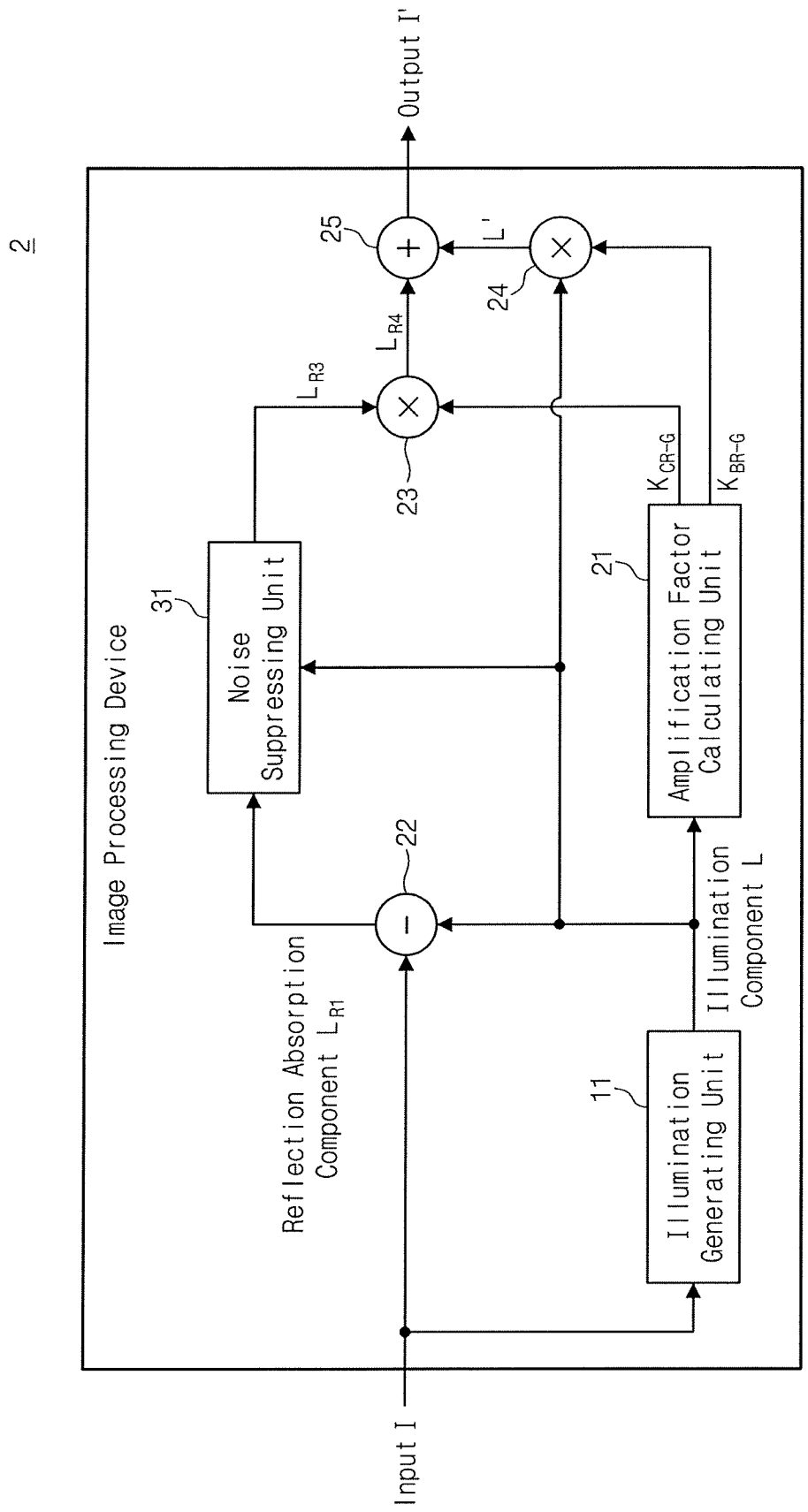
FIG. 9 is a schematic block diagram illustrating an exemplary configuration of an image processing device according to an embodiment of the inventive concept.

Referring to FIG. 9, an image processing device according to the embodiment will be described. FIG. 9 is a block diagram illustrating an exemplary configuration of an image processing device according to an embodiment of the inventive concept. Hereinafter, the image processing device 2 of FIG. 9 according to the embodiment may be written as "image processing device 2" in order to distinguish from the image processing device 1 of FIG. 5.

The image processing device 2 according to the embodiment suppresses a noise component existing in the contrast component. Therefore, the image processing device 2 according to the embodiment is different from the image processing device 1 according to the first embodiment in that the reflection-absorption component $L_R$ is processed for suppressing noise. In other words, the image processing device 2 according to the embodiment is different from the image processing device 1 according to the first embodiment in that a noise suppressing unit 31 is included as illustrated in FIG. 9. Here, for a function configuration of the image processing device 2 according to the embodiment, parts that are different from the image processing device 1 (see FIG. 5) are mainly described, and descriptions about other parts will be omitted for brevity.

The illumination generating unit 11 according to the embodiment generates an illumination component L on the basis of an input I and outputs data representing the generated illumination component L to the amplification factor calculating unit 21, subtracting unit 22, multiplying unit 24, and noise suppressing unit 31. In addition, the subtracting unit 22 calculates the reflection-absorption component $L_{R1}$ by subtracting the obtained illumination component L corresponding to a pixel of interest from the brightness component I of the pixel of interest, and outputs, to the noise suppressing unit 31, data representing the calculated reflection-absorption component $L_{R1}$ for each pixel of interest.

The noise suppressing unit 31 modulates the reflection-absorption component $L_{R1}$ output from the subtracting unit 22 in order to suppressing noise and output a noise-suppressed reflection-absorption component $L_{R3}$. In detail, the noise suppressing unit 31 obtains the illumination component L, which is calculated for each pixel of interest in the input image, from the illumination generating unit 11. In order to suppress noise, the noise suppressing unit 31 modulates the reflection-absorption component $L_{R1}$ output for each pixel of interest from the subtracting unit 22 on the basis of the obtained illumination component L corresponding to a corresponding pixel of interest. In addition, the modulation for noise suppression will be described later.

In addition, the noise suppressing unit 31 outputs, to the multiplying unit 23, data representing the reflection-absorption component $L_{R3}$ obtained by modulating the reflection-absorption component $L_{R1}$ for noise suppression for each pixel of interest.

The multiplying unit 23 obtains, from the amplification factor calculating unit 21, the contrast enhancement coefficient $K_{CR-G}$ calculated for each pixel of interest of the input image. The multiplying unit 23 further modulates the reflection-absorption component $L_{R3}$ by multiplying the reflection-absorption component after first modulation $L_{R3}$ output for each pixel of interest from the noise suppressing unit 31 by the contrast enhancement coefficient $K_{CR-G}$ corresponding to the obtained corresponding pixel of interest, and calculates the reflection-absorption component after second modulation $L_{R4}$. In addition, the multiplying unit 23 outputs, to the adding unit 25, data representing the reflection-absorption component after second modulation $L_{R4}$ calculated for each pixel of interest.

The adding unit 25 adds the illumination component after modulation L' output from the multiplying unit 24 and the reflection-absorption component after second modulation $L_{R4}$ output from the multiplying unit 23. In addition, the adding unit 25 outputs an image based on the brightness component I' that is generated by adding the illumination component after modulation L' and the reflection-absorption component after second modulation $L_{R4}$.

In other words, in the image processing device 2 according to the embodiment, the output I' is calculated based on the following Equation (12).

$$I' = K_{BR-G} \times L + K_{CR-G} \times L_{R3} \quad (12)$$

Here, a description will be provided in detail about the modulation for suppressing noise from the reflection-absorption component $L_{R1}$ by the noise suppressing unit 31. The noise suppressing unit 31 calculates the reflection-absorption component after first modulation $L_{R3}$ by modulating the reflection-absorption component $L_{R1}$ for noise suppression on the basis of the coefficient $K_{SV-N}$ (hereinafter "noise suppression coefficient $K_{SV-N}$" in some cases). In other words, the reflection-absorption component $L_{R3}$, on which the modulation for noise suppression is performed, is calculated based on the following Equation (13).

$$L_{R3} = K_{SV-N} \times L_{R1}^2 + (1 - K_{SV-N}) \cdot L_{R1} \quad (13)$$

In other words, as expressed as Equation (13), for noise suppression, the reflection-absorption component $L_{R3}$ is calculated by combining the reflection-absorption component $L_{R1}$ and a value of squaring the reflection-absorption component $L_{R1}$, and a combination ratio at this point is controlled by the noise suppression coefficient $K_{SV-N}$.

Figure 10:
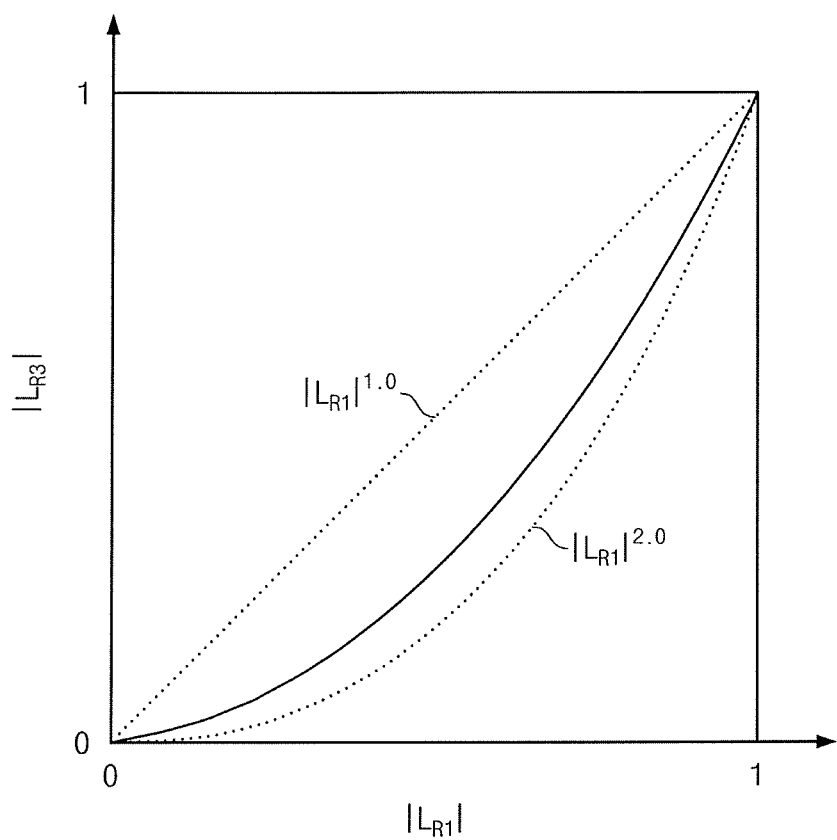
FIG. 10 is a graphical diagram illustrating the concept of modulating a reflection-absorption component on the basis of a noise reduction coefficient.

For example, FIG. 10 is a view illustrating a concept of modulating the reflection-absorption component $L_{R1}$ based on the noised suppression coefficient $K_{SV-N}$ and illustrates an exemplary relation between the reflection-absorption component before modulation $L_{R1}$ and the reflection-absorption component after first modulation $L_{R3}$. In FIG. 10, a horizontal axis denotes the reflection-absorption component $L_{R1}$ and a vertical axis denotes the reflection-absorption component after first modulation $L_{R3}$. In addition, in FIG. 10, a reference numeral $|L_{R1}|^{1.0}$ denotes an example of variation of the reflection-absorption component $L_{R1}$, and a reference numeral $|L_{R1}|^{2.0}$ denotes an example of variation of a value of squaring the reflection-absorption component $L_{R1}$.

Figure 11:
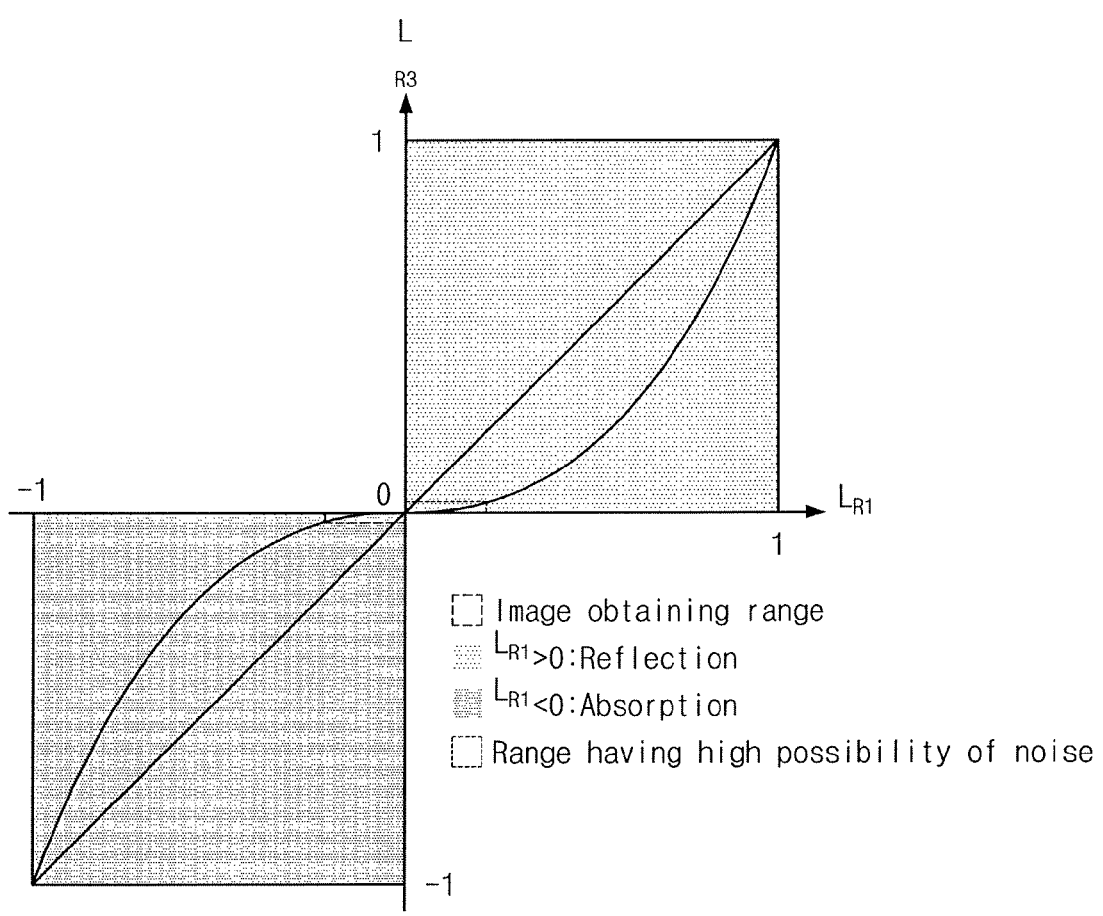
FIG. 11 is a graphical diagram for explaining an overview of reflection-absorption component modulation on the basis of a noise reduction coefficient.

FIG. 11 is a diagram for explaining an overview of modulating the reflection-absorption component $L_{R1}$ based on the noised suppression coefficient $K_{SV-N}$ and illustrates an exemplary graph that a relation between the reflection-absorption component before modulation $L_{R1}$ and the reflection-absorption component after modulation $L_{R3}$ illustrated in FIG. 10 is divided into positive and negative sides and deployed. In addition, in FIG. 11, a region where the reflection-absorption component $L_{R1} > 0$ corresponds to a component of reflection component, and a region where the reflection-absorption component $L_{R1} < 0$ corresponds to a component of absorption component.

As expressed as Equation (13) and illustrated in FIGS. 10 and 11, the noise suppressing unit 31 compresses the reflection-absorption component $L_{R1}$ according to a characteristic of square function. In particular, the reflection-absorption component $L_{R1}$ (e.g., the reflection-absorption component $L_{R1}$ having a value around 0), which has high possibility of a noise component, is modulated to have a smaller value.

Here, a method for setting the noise suppression coefficient $K_{SV-N}$ will be described in detail. The noise suppressing unit 31 is set to locally modulate the reflection-absorption component $L_{R1}$ according to the illumination component L. In other words, the noise suppression coefficient $K_{SV-N}$ is calculated based on the following Equation (14).

$$K_{SV-N} = \begin{cases} -\text{sv\_n\_grd} \times L + \text{sv\_n\_max} & \ldots L \leq \text{sv\_n\_th} \\ 0 & \ldots \text{otherwise} \end{cases} \quad (14)$$

In Equation (14), a coefficient sv_n_th denotes a threshold value, and a coefficient sv_n_max denotes a maximum value of the noise suppression coefficient $K_{SV-N}$. In addition, a coefficient sv_n_grd corresponds to a variation amount of the noise suppression coefficient $K_{SV-N}$ according to the illumination component L, and is expressed as sv_n_grd=sv_n_max/sv_n_th.

Figure 12:
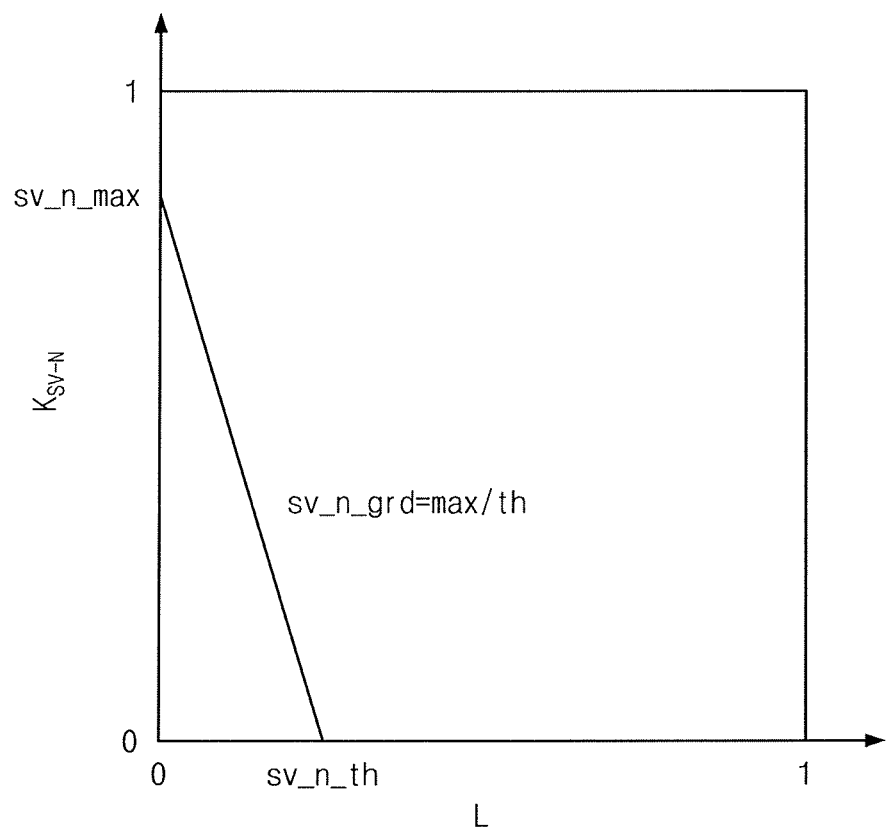
FIG. 12 is a graphical diagram illustrating an exemplary relation between an illumination component and a noise reduction coefficient.

For example, FIG. 12 is a graph representing an exemplary relation between the illumination component L and the noise suppression coefficient $K_{SV-N}$, expressed as Equation (14). In FIG. 12, a horizontal axis denotes the illumination component L and a vertical axis denotes the noise suppression coefficient $K_{SV-N}$.

As expressed in Equation (14) and illustrated in FIG. 11, as a part (e.g., black point) has a smaller value of the illumination component L, the noise control coefficient $K_{SV}$ is controlled to become higher. In other words, as the contrast enhancement coefficient $K_{CR-G}$ is greater and a degree of enhancement is higher, the noise suppression coefficient $K_{SV-N}$ is controlled to become higher. In addition, as a part (e.g., white point) has a greater value of the illumination component L, the noise control coefficient $K_{SV}$ is controlled to be lower.

According to this configuration, as the contrast enhancement coefficient $K_{CR-G}$ is greater, an effect of noise suppression becomes higher, and as the contrast enhancement coefficient $K_{CR-G}$ is smaller, an effect of noise suppression becomes lower. Here, for the contrast enhancement coefficient $K_{CR-G}$ having a small value, even when the noise suppression process is not performed, since a degree of enhancement is lower, the noise component does not come to the surface because the noise component is not enhanced.

In addition, in the foregoing example, even though the illumination component L is used for calculating the noise suppression coefficient $K_{SV-N}$, the noise suppression coefficient $K_{SV-N}$ may be calculated by replacing the illumination component L with the contrast enhancement coefficient $K_{CR-G}$.

As described above, on the basis of the noise suppression coefficient $K_{SV-N}$ that is adjusted according to the illumination component L, the image processing device 2 according to the embodiment locally modulates the reflection-absorption component $L_R$ on the basis of the illumination component L in order to suppress noise.

According to this configuration, even when an enhancement characteristic between reflection and absorption is not a target as illustrated in FIG. 3, the image processing device 2 may solve a corresponding asymmetric enhancement characteristic. In addition, according to the foregoing configuration, the image processing device 2 according to the embodiment may suppress enhancement of a small noise component such as a noise floor, and prevent degradation in quality of display due to surfacing of the noise component.

An image processing device according to another embodiment will be described. As described above, for a part (e.g., pattern style) where brightness (or gradation) is varied by a pattern of a subject, even though modulation (or enhancement) is performed with a small enhancement amount, an impression on the modulated image may differ according to a density of the pattern. As a detailed example, when modulation (or enhancement) is performed on a dense pattern style with an enhancement amount substantially identical to that of a coarse pattern style, the pattern is excessively enhanced (e.g., contrast thereof is excessively enhanced) and becomes an unnatural appearing image.

In addition, a description will be provided about an exemplary image processing device capable of suppressing degradation in quality of display according to the modulation of illumination component L by controlling an enhancement amount according to a local characteristic of an input image.

Figure 13:
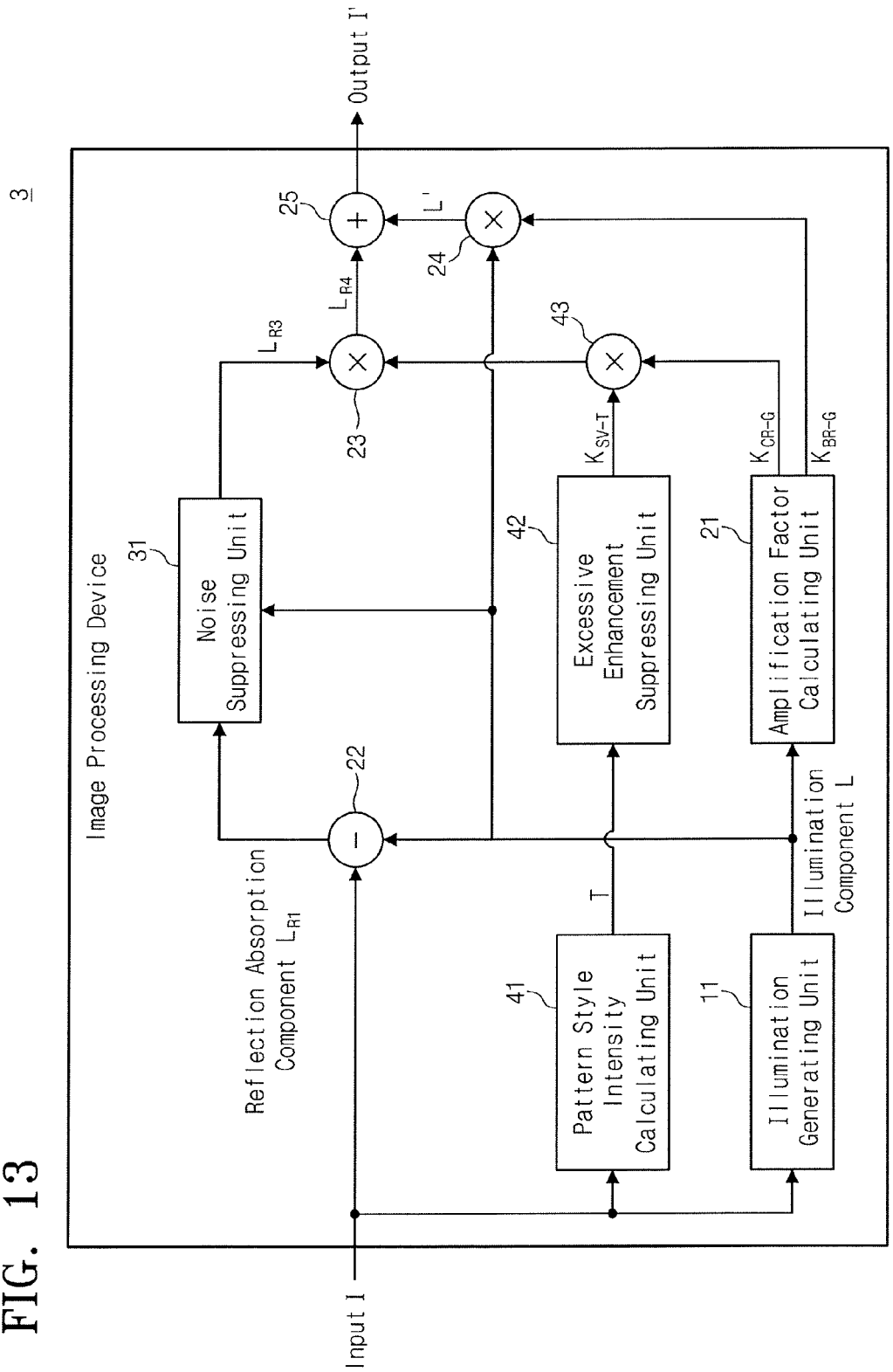
FIG. 13 is a schematic block diagram illustrating an exemplary configuration of an image processing device according to an embodiment of the inventive concept.

Referring to FIG. 13, an image processing device according to the embodiment will be described. FIG. 13 is a block diagram illustrating an exemplary configuration of an image processing device according to an embodiment of the inventive concept. Hereinafter, the image processing device according to the embodiment may be written as "image processing device 3" in some cases in order to distinguish it from the image processing device (e.g., the image processing devices 1 and 2) according to each of the above-described examples.

The image processing device 3 according to this embodiment is different from the image processing device 2 in that the image processing device 3 includes a pattern style intensity calculating unit 41, the excessive enhancement suppressing unit 42, and a multiplying unit 43. Here, for a configuration of the image processing device 3 according to the embodiment, parts different from the image processing device 2 (see FIG. 9) according to the second embodiment are mainly described, and descriptions about other parts may be omitted for brevity.

The pattern style intensity calculating unit 41 calculates a pattern style intensity T (e.g., the intensity representing density of the pattern style) on the basis of a brightness component I of a pixel of interest by sequentially taking each pixel of the input image as the pixel of interest.

A part where the pattern style is dense may be estimated as a part where a dispersion $\sigma^2$ is high, which is obtained from adjacent pixels included in a predetermined range (hereinafter, "reference pixel range" in some cases) around the pixel of interest, compared to a part where the pattern style is coarse. Therefore, the pattern style intensity calculating unit 41 calculates a dispersion $\sigma^2$ on the basis of intensities of brightness of the pixel of interest and each of the adjacent pixels around the pixel of interest, and calculates the pattern style intensity T on the basis of a corresponding dispersion $\sigma^2$.

Here, the pattern style intensity T(x, y) of the pixel of interest (x, y) is calculated based on the intensity I of brightness of the pixel of interest, a reference pixel distance n (e.g., an operator length n representing the area of the reference pixel range on the basis of the pixel of interest) in the reference pixel range, and a preset coefficient $\alpha$ (where $\alpha \geq 1$) according to the following Equations (15) and (16).

$$T(x, y) = \alpha \cdot \sigma^2(x, y) \quad (15)$$
$$= \alpha \cdot \frac{1}{(2n+1)^2} \sum_{i=-n}^{n} \sum_{j=-n}^{n} I^2_{x-i,y-j} - A^2(x, y)$$

$$A(x, y) = \frac{1}{(2n+1)^2} \sum_{i=-n}^{n} \sum_{j=-n}^{n} I_{x-i,y-j} \quad (16)$$

The pattern style intensity calculating unit 41 calculates the pattern style intensity T on the basis on the intensity I of brightness of the pixel of interest, and outputs the calculated pattern style intensity T for each pixel of interest to the excessive enhancement suppressing unit 42.

The excessive enhancement suppressing unit 42 obtains the pattern style intensity T calculated for each pixel of interest from the pattern style intensity calculating unit 41. In order to realize local modulation according to the pattern style intensity T (e.g., the density of pattern style), the excessive enhancement suppressing unit 42 calculates, for each pixel of interest, an excessive enhancement suppressing coefficient $K_{SV-T}$ on the basis of the pattern style intensity T. The excessive enhancement suppressing coefficient $K_{SV-T}$ is calculated based on the following Equation (17).

$$K_{SV-T} = \begin{cases} 1 & \ldots T < sv\_t\_th1 \\ sv\_t\_min & \ldots sv\_t\_th2 \leq T \\ -sv\_t\_grd \times T + sv\_t\_itc & \ldots \text{otherwise} \end{cases} \quad (17)$$

In Equation (17), coefficients sv_t_th1 and sv_t_th2 (where sv_t_th1<sv_t_th2) denote threshold values, and a coefficient sv_n_min denotes a minimum value of the excessive enhancement suppressing coefficient $K_{SV-T}$. In addition, a coefficient sv_t_grd corresponds to a variation amount of the excessive enhancement suppressing coefficient $K_{SV\text{-}T}$ according to the pattern style intensity T and is represented as sv_t_grd=(1−sv_t_min)/(sv_t_th2−sv_t_th1).

Figure 14:
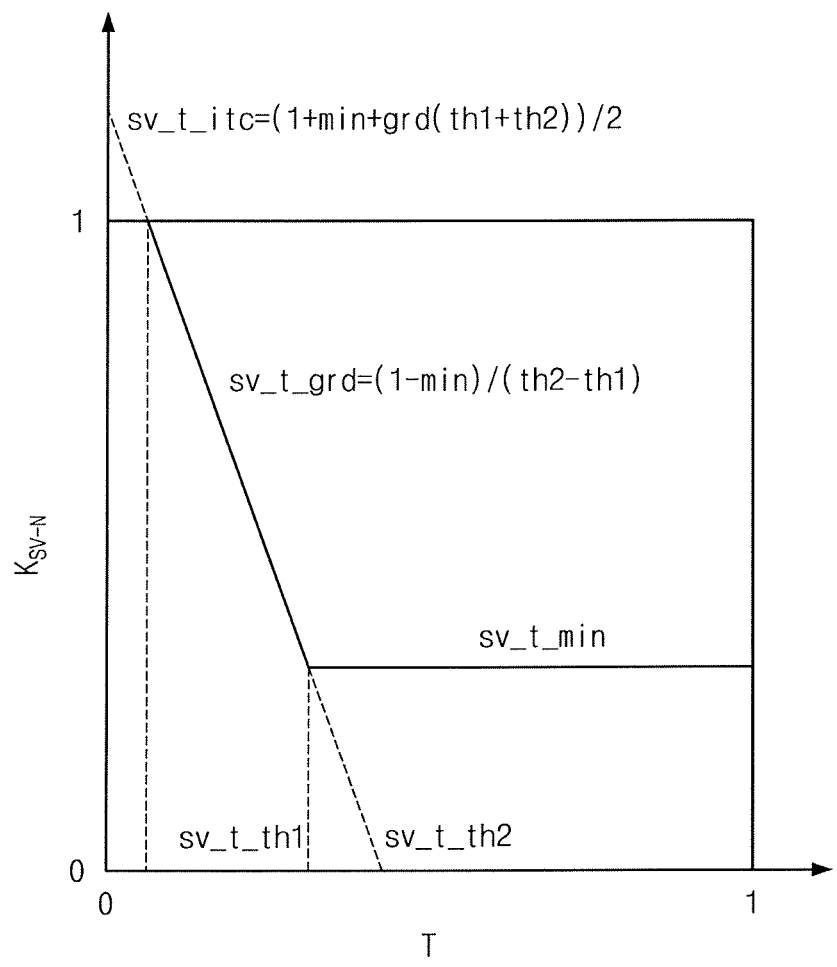
FIG. 14 is a graphical diagram illustrating an exemplary relation between a pattern style intensity and an excessive enhancement suppression coefficient.

For example, FIG. 14 is a graph representing an exemplary relationship between the pattern style intensity T and the excessive enhancement suppressing coefficient $K_{SV\text{-}T}$, expressed as Equation (17). In FIG. 14, a horizontal axis denotes the pattern style intensity T and a vertical axis denotes the excessive enhancement suppressing coefficient $K_{SV\text{-}T}$.

As in the foregoing, the excessive enhancement suppressing unit 42 calculates the excessive enhancement suppressing coefficient $K_{SV\text{-}T}$ for each pixel of interest on the basis of the obtained pattern style intensity T. In addition, the excessive enhancement suppressing unit 42 outputs the excessive enhancement suppressing coefficient $K_{SV\text{-}T}$ for each pixel of interest to the multiplying unit 43.

The multiplying unit 43 compensates for the contrast enhancement coefficient $K_{CR\text{-}G}$ according to the excessive enhancement suppressing coefficient $K_{SV\text{-}T}$. The multiplying unit 43 obtains, from the amplification factor calculating unit 21, the contrast enhancement coefficient $K_{CR\text{-}G}$ calculated for each pixel of interest of the input image. In addition, the multiplying unit 43 obtains the excessive enhancement suppressing coefficient $K_{SV\text{-}T}$ calculated for each pixel of interest from the excessive enhancement suppressing unit 42.

The multiplying unit 43 compensates for the contrast enhancement coefficient $K_{CR\text{-}G}$ for each pixel of interest by multiplying the contrast enhancement coefficient $K_{CR\text{-}G}$ by the excessive enhancement suppressing coefficient $K_{SV\text{-}T}$ corresponding to the pixel of interest.

In addition, the multiplying unit 43 outputs, to the multiplying unit 23, the contrast enhancement coefficient $K_{CR\text{-}G}$ compensated based on the excessive enhancement suppressing coefficient $K_{SV\text{-}T}$.

In addition, operations thereafter are substantially identical to those of the image processing device 2 according to the second embodiment. In other words, the multiplying unit 23 modulates the reflection-absorption component $L_{R3}$ by multiplying the reflection-absorption component $L_{R3}$ output for each pixel of interest from the noise suppressing unit 31 by the compensated contrast enhancement coefficient $K_{CR\text{-}G}$ corresponding to the pixel of interest, which is obtained from the multiplying unit 43, and calculates the reflection-absorption component after second modulation $L_{R4}$.

The adding unit 25 adds the illumination component after modulation L' output from the multiplying unit 24 and the reflection-absorption component after second modulation $L_{R4}$ output from the multiplying unit 23. In addition, the adding unit 25 outputs, as an output image, an image based on the brightness component I', which is generated by adding the illumination component after modulation L' to the reflection-absorption component after second modulation $L_{R4}$.

In other words, in the image processing device 3 according to the embodiment, the output I' is calculated based on the following Equation (18).

$$I'=K_{BR\text{-}G} \times L + K_{SV\text{-}T} \cdot K_{CR\text{-}G} \times L_{R3} \quad (18)$$

Here, as expressed in Equation (17) and illustrated in FIG. 14, for a part where the pattern style intensity T is higher (e.g., a part where the pattern style is denser), the excessive enhancement suppressing coefficient $K_{SV\text{-}T}$ operates to further lower the contrast enhancement coefficient $K_{CR\text{-}G}$. In addition, for a part where the pattern style intensity T is lower (e.g., a part where the pattern style is coarser), the excessive enhancement suppressing coefficient $K_{SV\text{-}T}$ operates to further weaken the suppression effect of the contrast enhancement coefficient $K_{CR\text{-}G}$. According to this configuration, in the image processing device 3 according to the embodiment, an enhancement amount is controllable according to the density of pattern style.

Referring to FIG. 13, although an exemplary configuration is described which includes the pattern style intensity calculating unit 41, excessive enhancement suppressing unit 42, and multiplying unit 43 in addition to the image processing device 2 (see FIG. 9) according to the second embodiment, the configuration is not limited thereto. In detail, a configuration is also possible to include the pattern style intensity calculating unit 41, excessive enhancement suppressing unit 42, and multiplying unit 43 in addition to the image processing device 1 (see FIG. 5). In this case, the output I' is calculated based on the following Equation (19).

$$I'=K_{BR\text{-}G} \times L + K_{SV\text{-}T} \cdot K_{CR\text{-}G} \times L_{R1} \quad (19)$$

As in the foregoing, the exemplary configuration of the image processing device 3 has been described with reference to FIGS. 13 and 14.

[4.2. Modification Example]

Next, an exemplary image processing device according to a modification example of the inventive concept will be described. The image processing device 3 according the embodiment controls the enhancement amount according to the density of pattern style by using the dispersion $\sigma^2$ as the pattern style intensity T and controlling the contrast enhancement coefficient $K_{CR\text{-}G}$ according to the excessive enhancement suppressing coefficient $K_{SV\text{-}T}$ with the pattern style intensity T.

As a boundary between the white and black points in the image, there are a boundary between a background and a subject (hereinafter "step style edge" in some cases) and a boundary where brightness (or gradation) is varied by the pattern of the subject (e.g., pattern style edge).

Here, a part where brightness varies according to the pattern of the subject (e.g., a pattern style part) may be considered as illuminated uniformly without depending on the pattern. Therefore, for example, improving quality of display is enabled by enhancing (e.g., controlling the contrast enhancement coefficient $K_{CR\text{-}G}$ to be higher) contrast for a part of the step style edge and by lowering (e.g., controlling the contrast enhancement coefficient $K_{CR\text{-}G}$ to be lower) a contrast enhancement effect for a part of the pattern style edge.

Hereinafter, as an image processing device according to a modification example of the embodiment, an exemplary structure will be described which enables the contrast enhancement coefficient $K_{CR\text{-}G}$ to be controlled by distinguishing the step style edge from the pattern style edge. Hereinafter, the image processing device according to the modification example of the embodiment may be written as "image processing device 3'" in some cases.

The image processing device 3' according to the modification example of the embodiment calculates the pattern style intensity T by using a gradient ∇ based on the pixel of interest, and discrepancy with the dispersion $\sigma^2$ (in other words, standard deviation σ) based on the pixel of interest.

In detail, the gradient ∇ represents a difference between pixels adjacent to the pixel of interest. In addition, the standard deviation σ represents a variation of the reference pixel range. In an ideal state, in the step style edge, a maximum value (or vertex) of the standard deviation σ and a maximum value of an absolute value of the gradient ∇ are nearly identical. On the other hand, in the pattern style edge, the standard deviation σ shows a larger value than the absolute value of the gradient ∇. Here, the image processing device 3' according to the modification example determines the step style edge and pattern style edge, and controls the pattern style intensity T according to the determination result.

In detail, the gradient ∇ may be calculated by convolution integration using a filter operator on the basis of the following Equation (20).

$$f'(x) = f(x) \\ = \nabla \\ = I \otimes W \qquad (20)$$

In addition, in Equation (20), W denotes an operator (hereinafter "gradient operator" in some cases) for calculating the gradient ∇. For example, the following Equation (21) represents an exemplary gradient operator W in a case where the operator length n=1.

$$W=[-1\ 0\ 1]\cdot \tfrac{1}{2} \qquad (21)$$

As another example, the following Equation (22) represents an exemplary gradient operator W in a case where the operator length n=2.

$$W=[--1\text{-}1\ 0\ 1\ 1]\cdot \tfrac{1}{4} \qquad (22)$$

The gradient operator expressed in Equations (21) and (22) is just an example, and the operator length n or each coefficient of the operator may be properly changed.

Since a method for calculating the dispersion σ² is expressed in Equations (15) and (16), a detailed description thereof will be omitted.

Here, when the discrepancy between the gradient ∇ and standard deviation σ is a step style intensity $K_S$, and coordinates of the pixel of interest are (x, y), the step style intensity $K_S(x, y)$ of the pixel of interest is calculated according to the following Equation (23) on the basis of the gradient ∇(x, y) and standard deviation σ(x, y).

$$K_S(x, y) = \frac{k_\nabla \cdot |\nabla(x, y)|}{k_\sigma \cdot \sigma(x, y)} = k \cdot \frac{|\nabla(x, y)|}{\sigma(x, y)} \qquad (23)$$

In Equation (23), k∇ and kσ are set so that a ratio of an absolute value of the gradient ∇(x, y) to a maximum value of the standard deviation σ(x, y) is 1. k∇ and kσ are compensation coefficients (in other words, coefficients for normalization) for each of the gradient ∇(x, y) and the standard deviation σ(x, y). In addition, the compensation coefficient k corresponds to the proper compensation coefficients k∇ and kσ.

In addition, the foregoing Equation (23) for calculating the step style intensity $K_S$ is just an example, and the method for calculating the step style intensity $K_S$ is not limited to the foregoing example, when the discrepancy exists between the gradient ∇(x, y) and standard deviation σ(x, y) (e.g., dispersion σ²).

As a detailed example, the step style intensity $K_S$ may be calculated based on the discrepancy between a square of the gradient ∇ and the dispersion σ². In this case, when the coordinates of the pixel of interest are (x, y), the step style intensity $K_S(x, y)$ of the pixel of interest is calculated based on the gradient ∇(x, y) and dispersion σ²(x, y) of the pixel of interest according to the following Equation (24).

$$K_S(x, y) = \frac{k_\nabla \cdot \nabla^2(x, y)}{k_\sigma \cdot \sigma^2(x, y)} = k \cdot \frac{\nabla^2(x, y)}{\sigma^2(x, y)} \qquad (24)$$

The image processing device 3' according to the modification example calculates an edge intensity $K_G$ on the basis of the step style intensity $K_S$ and the absolute value of the gradient ∇. In detail, the edge intensity $K_G$ is calculated based on the following Equation (25).

$$K_G(x,y)=|\nabla(x,y)|\cdot K_S \qquad (25)$$

As another example, the edge intensity $K_G$ may be calculated for each pixel of interest of the input image by multiplying the gradient of the pixel of image and the step style intensity $K_S$ as expressed as Equation (26).

$$K_G(x,y)=\nabla^2(x,y)\cdot K_S \qquad (26)$$

The edge intensity $K_G$ calculated like this is suppressed at the edge part of the pattern style and enhanced at the edge part of the step style. The image processing device 3' according to the modification example calculates the pattern style intensity T according to the edge intensity $K_G$ by using a characteristic of the edge intensity $K_G$. In detail, the pattern style intensity T is calculated based on the following Equation (27).

$$T=\alpha(\sigma^2-K_G) \qquad (27)$$

In addition, operations thereafter are substantially identical to those of the image processing device 3 of FIG. 13, so duplicate description will be omitted. In other words, the excessive enhancement suppressing coefficient $K_{SV\text{-}T}$ is derived according to the pattern style intensity T, and the contrast enhancement coefficient $K_{CR\text{-}G}$ is compensated based on the excessive enhancement suppressing coefficient $K_{SV\text{-}T}$.

According to this configuration, the image processing device 3' according to the modification example may determine the edge part of the step style and the edge part of the pattern style to realize local enhancement of the contrast component. In other words, according to the image processing device 3' of the modification example, the quality of display may be improved by further enhancing contrast for the step style edge and a coarse part of the pattern style, and further lowering a contrast enhancement effect for the edge part of the dense pattern style.

Hereinbefore, the image processing device 3' according to the modification example of the embodiment has been described, The image processing device 3' according to the embodiment compensates for the contrast enhancement coefficient $K_{CR\text{-}G}$ by the excessive enhancement suppressing coefficient $K_{SV\text{-}T}$ by setting the excessive enhancement suppressing coefficient $K_{SV\text{-}T}$ according to the pattern style intensity T based on the dispersion σ² of input I. In other words, the image processing device 3' according to the embodiment locally compensates for the contrast enhancement coefficient $K_{CR\text{-}G}$ on the basis of the pattern style intensity T.

According to this configuration, the image processing device 3' according to the embodiment is enabled to control the contrast enhancement coefficient $K_{CR\text{-}G}$ to be further lowered for a part where the pattern style intensity T is higher (e.g., a part where the pattern style is denser). In addition, for a part where the pattern style intensity T is lower (e.g., a part where the pattern style is coarser), the image processing device 3' controls the suppression effect of the contrast enhancement coefficient $K_{CR\text{-}G}$ to be weaker. In other words, the image processing device 3' according to the embodiment may prevent occurrence of a case where a dense pattern style part in the input image is excessively enhanced and obtain a natural output image.

A series of operations of the image processing device according to each of the embodiments may be performed by a program for allowing a CPU to operate each element of the image processing device. This program may be executed through an operating system (OS) installed therein, or directly, for example. In addition, when a device including elements for executing the processes is readable, a recorded location is not limited. For example, the program may be stored on a recording medium accessed from the outside of the device. In this case, the CPU of the device is configured to execute the corresponding program by accessing the recording medium in which the program is stored.

According to embodiments of the inventive concept, an image processing device, an image processing method, and a program may be provided that are capable of reducing the size of a circuit for realizing image processing using the Retinex theory.

The above-disclosed subject matter is to be considered illustrative and not suppressive, and the appended claims are intended to cover all such modifications, enhancements, and other embodiments as may be recognized by those of ordinary skill in the pertinent art, and which fall within the true spirit and scope of the inventive concept. Thus, to the maximum extent allowed by law, the scope of the inventive concept is to be determined by the broadest permissible interpretation of the following claims and their equivalents, and shall not be suppressed or limited by the foregoing detailed description of illustrative exemplary embodiments.

What is claimed is:

1. An image processing device comprising:
    an input configured to receive dynamic range restricted image intensity data from an image acquisition device;
    a filter connected to the input and configured to extract an illumination component from the intensity data;
    an amplification factor calculator connected to the filter and configured to provide at least a first coefficient;
    a first modulator connected to the amplification factor calculator and configured to multiply at least the first coefficient by at least one component of the intensity data; and
    an output connected to the first modulator and configured to provide modulated data as dynamic range compensated image intensity data for display.

2. The image processing device of claim 1 wherein the at least one component is a reflection-absorption component based on a difference between a pixel value of a pixel of interest among the intensity data and an illumination component of the pixel of interest, the device further comprising:
    a second modulator connected to the amplification factor calculator and configured to multiply a second coefficient from the amplification factor calculator by the illumination component to modulate the illumination component; and
    an adder connected to the first and second modulators and configured to add a modulated reflection-absorption component to the modulated illumination component prior to output.

3. The image processing device of claim 2, wherein the amplification factor calculator is configured to provide the first coefficient based on a second value obtained by multiplying a square of a first value based on the illumination component by a preset third coefficient.

4. The image processing device of claim 3, wherein, when the illumination component is L, the third coefficients corresponding to the square of the first value are cr_slope1, cr_slope2, and cr_slope3, a preset gain is cr_gain, and a preset offset value is cr_offset, the first coefficient $K_{CR-G}$ is calculated based on the following Equation $$K_{CR-G}=cr\_gain\{cr\_slope3(1-L)^3+cr\_slope2(1-L)^2+cr\_slope1(1-L)\}+cr\_offset\ 1=cr\_slope3+cr\_slope2+cr\_slope1 \quad [\text{Equation}].$$

5. The image processing device of claim of 3, wherein the third coefficient is preset based on an approximate value of a function that represents a relation between the illumination component and the illumination component after modulation.

6. The image processing device of claim 2, where the amplification factor calculator is configured to provide the second coefficient based on the first coefficient.

7. The image processing device of claim 2, further comprising:
    a noise suppression filter configured to modulate the reflection-absorption component using a fourth coefficient based on the illumination component,
    wherein the first modulator modulates the reflection-absorption component by multiplying the first coefficient by the reflection-absorption component modulated using the fourth coefficient.

8. The image processing device of claim 7, wherein the noise suppression filter is configured to modulate the reflection-absorption component using the fourth coefficient with respect to a pixel whose illumination component is equal to or smaller than a threshold value.

9. The image processing device of claim 8, wherein the fourth coefficient is calculated based on the following Equation, when the illumination component is L, the threshold value is sv_n_th, a maximum value of the fourth coefficient is sv_n_max, and a variation rate of the fourth coefficient is sv_n_grd.

$$K_{SV-N} = \begin{cases} -\text{sv\_n\_grd} \times L + \text{sv\_n\_max} & \ldots L \leq \text{sv\_n\_th} \\ 0 & \ldots \text{otherwise} \end{cases} \quad [\text{Equation}]$$

10. The image processing device of claim 2, further comprising:
    an intensity calculator configured to provide a pattern-style intensity based on a dispersion of pixel values of the pixel of interest and each of adjacent pixels arranged within a predetermined range around the pixel of interest,
    wherein the second modulator modulates the illumination component by multiplying the illumination component by the second coefficient controlled based on the pattern style intensity.

11. The image processing device of claim 10, wherein the intensity calculator is configured to provide the pattern style intensity based on the dispersion and an edge intensity according to a discrepancy between the dispersion and a gradient based on each pixel value of the adjacent pixels.

12. An image processing method comprising:
    obtaining image data from an image acquisition device;
    multiplying a first coefficient by a reflection-absorption component, which is based on a difference between a pixel value of a pixel of interest among the image data and an illumination component of the pixel of interest, to modulate the reflection-absorption component;

multiplying a second coefficient by the illumination component to modulate the illumination component;

adding the reflection-absorption component after modulation to the illumination component after modulation; and displaying the modulated data as a dynamic range compensated image.

13. The method of claim 12 wherein the illumination component is substantially equal to an input brightness component divided by a reflectance component in accordance with the Retinex theory.

14. The method of claim 12 wherein the first and second coefficients are each based on an amplification factor calculation using only the illumination component as input.

15. The method of claim 13 wherein an output brightness component is based on the modulated illumination component and the modulated reflection-absorption component.

16. The method of claim 15, further comprising receiving and displaying the output brightness component on a display.

17. The method of claim 15 wherein each of the illumination component, modulated illumination component, reflection-absorption component, and output brightness component may be obtained by mathematical operations consisting of multiplication and addition without recourse to stored look-up values.

18. The method of claim 12, further comprising:
suppressing noise in the reflection-absorption component based on the illumination component.

19. The method of claim 13, further comprising:
calculating a pattern style intensity based on the input brightness component; and
suppressing excessive enhancement of the reflection-absorption component based on the calculated pattern style intensity.

20. A computer program that is recorded on a non-transitory recording medium and linked to a computer to be configured to execute:
obtaining image data from an image acquisition device;
multiplying a first coefficient by a reflection-absorption component, which is based on a difference between a pixel value of a pixel of interest among the image data and an illumination component of the pixel of interest, to modulate the reflection-absorption component;
multiplying a second coefficient by the illumination component to modulate the illumination component;
adding the reflection-absorption component after modulation to the illumination component after modulation; and
displaying the modulated data as a dynamic range compensated image.

* * * * *